United States Patent
Houze et al.

(10) Patent No.: US 11,845,878 B2
(45) Date of Patent: Dec. 19, 2023

(54) WASH PRIMER COMPOSITION

(71) Applicant: AXALTA COATING SYSTEMS IP CO., LLC, Wilmington, DE (US)

(72) Inventors: Eric Houze, Philadelphia, PA (US); Anja Lothert, Philadelphia, PA (US); Gaurang Bhargava, Philadelphia, PA (US); Martin Wendt, Philadelphia, PA (US); Robert Nahas, Philadelphia, PA (US); Iain Harvey, Hatfield, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 509 days.

(21) Appl. No.: 17/264,419

(22) PCT Filed: Jul. 31, 2019

(86) PCT No.: PCT/US2019/044473
§ 371 (c)(1),
(2) Date: Jan. 29, 2021

(87) PCT Pub. No.: WO2020/028551
PCT Pub. Date: Feb. 6, 2020

(65) Prior Publication Data
US 2021/0332258 A1 Oct. 28, 2021

Related U.S. Application Data

(60) Provisional application No. 62/712,682, filed on Jul. 31, 2018.

(51) Int. Cl.
*C09D 129/14* (2006.01)
*C09D 7/61* (2018.01)
*C09D 5/12* (2006.01)
*C08K 3/36* (2006.01)
*C08K 3/32* (2006.01)

(52) U.S. Cl.
CPC ............ *C09D 129/14* (2013.01); *C09D 5/12* (2013.01); *C09D 7/61* (2018.01); *C08K 3/36* (2013.01); *C08K 2003/329* (2013.01)

(58) Field of Classification Search
None
See application file for complete search history.

(56) References Cited

U.S. PATENT DOCUMENTS

| | | | | | |
|---|---|---|---|---|---|
| 4,849,297 | A | * | 7/1989 | Mansell | C09C 1/28 106/14.44 |
| 5,202,367 | A | * | 4/1993 | Hegedus | C08G 18/4236 524/404 |
| 5,846,923 | A | * | 12/1998 | Reierson | C23G 1/26 558/158 |
| 6,069,210 | A | * | 5/2000 | Cartridge | C09D 7/45 523/160 |
| 2011/0171388 | A1 | * | 7/2011 | Rawlins | C09D 163/00 427/386 |
| 2013/0035421 | A1 | * | 2/2013 | Millero | C09D 7/67 977/773 |
| 2016/0194501 | A1 | | 7/2016 | Walters et al. | |
| 2019/0144688 | A1 | * | 5/2019 | Kang | C09D 133/02 106/14.12 |

FOREIGN PATENT DOCUMENTS

| | | | | |
|---|---|---|---|---|
| AU | 3603871 | A | 5/1973 | |
| CN | 101993644 | A | 3/2011 | |
| EP | 3456862 | A1 | 3/2019 | |
| JP | 0912931 | A | 1/1997 | |
| JP | H09/12931 | A * | 1/1997 | ............ C09D 163/00 |
| JP | 2011/052213 | * | 3/2011 | ............ B32B 15/08 |
| WO | 2007025297 | A2 | 3/2007 | |
| WO | 2017195652 | A1 | 11/2017 | |

OTHER PUBLICATIONS

Takeya—JP H09-12931 A—PCT D2—MT—corrosion treatment for metal—1997 (Year: 1997).*
Matsuda—JP 2011-052213 A—sister Euro D5—MT—sister CN101993644—corrosion resist coating—2011 (Year: 2011).*
Zhao Yang et al. "Chemical Transformation of Oil Reservoir", Oilfield Chemistry. 2019, p. 193.
EPO, European Extended Search Report issued in EP App. No. 22190468.3-1102, dated Jan. 9, 2023.

* cited by examiner

*Primary Examiner* — John Vincent Lawler
(74) *Attorney, Agent, or Firm* — Lorenz & Kopf, LLP

(57) ABSTRACT

A coating composition includes a (A) binder component and a (B) pigment component. The (A) binder component includes (A1) polyvinyl butyrate, (A2) a particular film forming resin, (A3) an acid, (A4) an optional functionalized tri-alkoxy silane, and (A5) an optional polymeric phosphate ester. The (B) pigment component includes (B1) a calcium ion-exchanged silica, (B2) a corrosion inhibiting pigment, and (B3), a polyalkylene oxide phosphate. The coating composition is formed by combining the aforementioned components. In a method, the coating composition is applied to a substrate.

20 Claims, No Drawings

WASH PRIMER COMPOSITION

CROSS-REFERENCE TO RELATED APPLICATIONS

This application is a U.S. National-Stage entry under 35 U.S.C. § 371 based on International Application No. PCT/US2019/044473, filed Jul. 31, 2019, which was published under PCT Article 21(2) and which claims priority to U.S. Provisional Application No. 62/712,682, filed Jul. 31, 2018, which are all hereby incorporated in their entirety by reference.

FIELD OF THE DISCLOSURE

This disclosure relates to a coating composition. More specifically, the coating composition utilizes a binder component including polyvinyl butyral and a particular film forming resin, an acid, an optional functionalized tri-alkoxy silane, an optional phosphate ester, and also a pigment component including a calcium ion-exchange silica, a corrosion inhibiting pigment and a polyalkylene oxide phosphate.

BACKGROUND

Coating systems that are deposited onto a substrate and cured, such as "color-plus-clear" and monocoat coating systems, can be subject to damage from the environment. For example, corrosion of a coated metallic substrate can occur as the substrate is exposed to oxygen and water present in the atmosphere. Consequently, a primer layer is often used to protect the substrate from corrosion. The primer layer is often applied directly to a bare or pretreated metallic substrate. In some cases, particularly where the primer layer is to be applied over a bare metallic substrate, the primer layer is deposited from a composition that includes a material, such as an acid, such as phosphoric acid, which enhances the adhesion of the primer layer to the substrate. Such primers are sometimes known as etch, or wash, primers.

As indicated, in some cases metallic substrates are pretreated before a primer layer is applied (if such a primer layer is used). Such pretreatments often involve the application of a phosphate conversion coating, followed by a rinse, prior to the application of a protective or decorative coating. The pretreatment often acts to passivate the metal substrate and promotes corrosion resistance.

Historically, corrosion resistant coatings and metal pretreatments have utilized chromium compounds and/or other toxic metals, such as lead, to achieve a desired level of corrosion resistance and adhesion to subsequently applied coatings. For example, metal pretreatments often utilize phosphate conversion compositions that contain toxic metals, such as nickel, and post-rinses that contain chrome. In addition, such compositions often contain chromium compounds. The use of chromium and/or other toxic metals, however, may result in the production of waste streams that pose environmental concerns and disposal issues.

More recently, efforts have been made to reduce or eliminate the use of chromium and/or other toxic metals. As a result, compositions have been developed that contain other materials added to inhibit corrosion. These materials have included, for example, zinc phosphate, iron phosphate, zinc molybdate, and calcium molybdate particles, among others, and typically comprise particles to help resist corrosion. In some cases, these new compositions are inferior to their chrome containing counterparts.

Accordingly, there remains an opportunity to develop an improved chromium free composition that exhibits corrosion resistance properties the same as, or superior to, a similar chromium containing composition. In addition, it would be desirable to provide methods for treating metal substrates, including bare metal substrates, to improve the corrosion resistance of such substrates, wherein the method does not involve the use of chromium and/or other toxic metals.

SUMMARY OF THE DISCLOSURE

In one embodiment, the disclosure provides a coating composition including:
A. a binder component including;
  (1) polyvinyl butyral present in an amount of from about 30 to about 70 parts by weight based on 100 parts by weight of said binder component;
  (2) a film forming resin that is Poly(Bisphenol A-Co-Epichlorohydrin) Glycidyl End-Capped and that is present in an amount of from about 10 to about 40 parts by weight based on 100 parts by weight of said binder component;
  (3) an acid present in an amount of from about 10 to about 30 parts by weight based on 100 parts by weight of said binder component; and
  (4) a functionalized tri-alkoxy silane present in an amount of from about 3 to about 10 parts by weight based on 100 parts by weight of said binder component; and
B. a pigment component including;
  (1) a calcium ion-exchanged silica present in an amount of from about 30 to about 40 parts by weight based on 100 parts by weight of said binder component;
  (2) a corrosion inhibiting pigment present in an amount of from about 40 to about 50 parts by weight based on 100 parts by weight of said binder component; and
  (3) a polyalkylene oxide phosphate present in an amount of from about 1 to about 7 parts by weight based on 100 parts by weight of said binder component.

In another embodiment, the coating composition consists essentially of (A)(1)-(A)(4) and (B)(1)-(B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight of the binder component. In a further embodiment, the coating composition consists of (A)(1)-(A)(4) and (B)(1)-(B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component. This disclosure also provides a method of forming the coating composition including the step of combining (A)(1), (A)(2), (A)(3), (A)(4), (B)(1), (B)(2), and (B)(3). This disclosure further provides a method including the step of applying the coating composition to a metal substrate.

In another embodiment, this disclosure provides a coating composition including:

A. a binder component including;
  (1) polyvinyl butyral present in an amount of from about 30 to about 70 parts by weight based on 100 parts by weight of said binder component;
  (2) a film forming resin that is Poly[(Phenyl Glycidyl Ether)-Co-Formaldehyde] and that is present in an amount of from about 10 to about 40 parts by weight based on 100 parts by weight of said binder component;
  (3) an acid present in an amount of from about 10 to about 30 parts by weight based on 100 parts by weight of said binder component; and
  (4) a functionalized tri-alkoxy silane present in an amount of from about 3 to about 10 parts by weight based on 100 parts by weight of said binder component; and B. a pigment component including;
  (1) a calcium ion-exchanged silica present in an amount of from about 30 to about 40 parts by weight based on 100 parts by weight of said binder component;
  (2) a corrosion inhibiting pigment present in an amount of from about 40 to about 50 parts by weight based on 100 parts by weight of said binder component; and
  (3) a polyalkylene oxide phosphate present in an amount of from about 1 to about 7 parts by weight based on 100 parts by weight of said binder component.

In another embodiment, the coating composition consists essentially of (A)(1)-(A)(4) and (B)(1)-(B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component. In a further embodiment, the coating composition consists of (A)(1)-(A)(4) and (B)(1)-(B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component. This disclosure also provides a method of forming the coating composition including the step of combining (A)(1), (A)(2), (A)(3), (A)(4), (B)(1), (B)(2), and (B)(3). This disclosure further provides a method including the step of applying the coating composition to a metal substrate.

In still another embodiment, this disclosure provides a coating composition including:

A. a binder component including;
  (1) polyvinyl butyral present in an amount of from about 30 to about 70 parts by weight based on 100 parts by weight of said binder component;
  (2) a film forming resin that is Poly(Bisphenol A-Co-Epichlorohydrin) Glycidyl End-Capped and that is present in an amount of from about 10 to about 40 parts by weight based on 100 parts by weight of said binder component;
  (3) an acid present in an amount of from about 10 to about 30 parts by weight based on 100 parts by weight of said binder component; and
  (5) a polymeric phosphate ester present in an amount of from about 3 to about 10 parts by weight based on 100 parts by weight of said binder component; and B. a pigment component including;
  (1) a calcium ion-exchanged silica present in an amount of from about 30 to about 40 parts by weight based on 100 parts by weight of said binder component;
  (2) a corrosion inhibiting pigment present in an amount of from about 40 to about 50 parts by weight based on 100 parts by weight of said binder component; and
  (3) a polyalkylene oxide phosphate present in an amount of from about 1 to about 7 parts by weight based on 100 parts by weight of said binder component.

In another embodiment, the coating composition consists essentially of (A)(1), (A)(2), (A)(3), and (A)(5) and (B)(1)-(B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component. In a further embodiment, the coating composition consists of (A)(1), (A)(2), (A)(3), and (A)(5) and (B)(1)-(B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component. This disclosure also provides a method of forming the coating composition including the step of combining ((A)(1), (A)(2), (A)(3), (A)(5), (B)(1), (B)(2), and (B)(3). This disclosure further provides a method including the step of applying the coating composition to a metal substrate.

DETAILED DESCRIPTION

The following detailed description is merely exemplary in nature and is not intended to limit the coating composition. Furthermore, there is no intention to be bound by any theory presented in the preceding background or the following detailed description.

Embodiments of the present disclosure are generally directed to coating compositions and methods for making the same. For the sake of brevity, conventional techniques related to coating compositions may not be described in detail herein. Moreover, the various tasks and process steps described herein may be incorporated into a more comprehensive procedure or process having additional steps or functionality not described in detail herein. In particular, various steps in the manufacture of coating compositions are well-known and so, in the interest of brevity, many conventional steps will only be mentioned briefly herein or will be omitted entirely without providing the well-known process details.

In certain embodiments, the present disclosure is directed to coating compositions that are substantially free of chromium containing material. In other embodiments, the coating compositions of the present disclosure are completely free of such a material. As used herein, the term "substantially free" means that the material is present in the coating composition, if at all, as an incidental impurity. In other words, the material does not affect the properties of the coating composition. This means that, in certain embodiments of the present disclosure, the coating composition includes less than 2, 1, 0.5, 0.1, or 0.05 weight percent of chromium containing material or, in some cases, less than 0.05 weight percent of chromium containing material, wherein such weight percents are based on the total weight of the composition. As used herein, the term "completely free" means that the material is not present in the coating composition at all. Thus, certain embodiments of the coating compositions of the present disclosure contain no chromium-containing material. As used herein, the term "chromium containing material" refers to materials that include hexavalent chromium. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, and strontium dichromate.

It is expressly contemplated that, in various non-limiting embodiments, anywhere that the terminology "coating composition" is used herein, the terminology "wash primer composition" or "wash primer" may be substituted. In other words, the coating composition may be alternatively defined as a wash primer or wash primer composition.

Certain embodiments of the coating compositions of the present disclosure are substantially free of other undesirable materials, including toxic metals, such as lead and nickel. In certain embodiments, the coating compositions of the present disclosure are completely free of such materials.

This disclosure provides a coating composition that includes a binder component and a pigment component, each of which is described in detail below.

(A) Binder Component:
(A1) Polyvinyl Butyral:

The binder component includes polyvinyl butyral (i.e., PVB resin). Such resins may be produced by reacting a polyvinyl alcohol with butyraldehyde. Polyvinyl alcohols may be produced by the polymerization of vinyl acetate monomer and the subsequent, alkaline-catalyzed methanolysis of the polyvinyl acetate obtained. The acetalization reaction of polyvinyl alcohol and butyraldehyde is not quantitative, so the resulting polyvinyl butyral may contain a certain amount of hydroxyl groups. In addition, a small amount of acetyl groups may remain in the polymer chain. Commercially available polyvinyl butyral resins may be used. Such resins often have an average degree of polymerization of 500 to 1000 and a degree of butyration of 57 to 70 mole percent. However, any PVB resin known in the art can be used. Specific examples of suitable polyvinyl butyral resins include the Mowital® line of polyvinyl butyral resins commercially available from Kuraray America, Inc., New York, N.Y. and the Butvar® polyvinyl butyral resins commercially available from Eastman Chemical.

In one embodiment, the PVB resin is present in an amount of from about 30 to about 70 parts by weight based on 100 parts by weight of the binder component. In various embodiments, the PVB resin is present in an amount of from about 35 to about 65, about 40 to about 60, about 45 to about 55, or about 50 to about 55, parts by weight based on 100 parts by weight of the binder component. In other embodiments, the PVB resin is present in an amount of from about 30 to about 70, e.g. about 35 to about 65, about 40 to about 60, about 45 to about 55, about 50 to about 55, about 60 to about 70, about 60 to about 65, about 65 to about 70, about 61 to about 69, about 62 to about 68, about 63 to about 67, about 64 to about 65, or about 60, 61, 62, 63, 64, 65, 66, 67, 68, 69, or 70, parts by weight based on 100 parts by weight of the binder component. In various non-limiting embodiments, all values and ranges of values including and between those set forth above are expressly contemplated for use herein.

(A2) Film Forming Resin:

The binder component also includes a film forming resin in addition to the PVB resin. The film forming resin may be a polymer chosen from Poly(Bisphenol A-Co-Epichlorohydrin) Glycidyl End-Capped, Poly[(Phenyl Glycidyl Ether)-Co-Formaldehyde], epoxy esters, phenolic resins, and combinations thereof. In one embodiment, the film forming resin is Poly(Bisphenol A-Co-Epichlorohydrin) Glycidyl End-Capped. In another embodiment, the film forming resin is Poly[(Phenyl Glycidyl Ether)-Co-Formaldehyde]. In another embodiment, the film forming resin is an epoxy ester. In another embodiment the film forming resin is a phenolic resin. In another embodiment, the film forming resin is a combination of two or more of the aforementioned resins.

The Poly(Bisphenol A-Co-Epichlorohydrin) Glycidyl End-Capped may be any known in the art, e.g. Epon 1001 or 1004. The Poly[(Phenyl Glycidyl Ether)-Co-Formaldehyde] may be any known in the art, e.g. DER 354, Epon 862, Epon 869, DEN 431 and DEN 438-85. The epoxy ester may be any known in the art, e.g. Beckopox EM460. The phenolic resin may also be any known in the art, e.g. Phenodur PR263/70B This film forming resin is thought to increase the spray solids and improve the manufacturability of the coating composition while not compromising the film properties provided by the PVB resin. This film forming resin may also enhance wet adhesion, chip resistance, corrosion resistance and/or flexibility of the PVB resin.

Additional film-forming resins that may also be used in the coating compositions of the present disclosure include, without limitation, those used in automotive OEM coating compositions, automotive refinish coating compositions, industrial coating compositions, architectural coating compositions, coil coating compositions, and aerospace coating compositions, among others. In certain embodiments, the additional film-forming resin is or includes a thermosetting film-forming resin. As used herein, the term "thermosetting" refers to resins that "set" irreversibly upon curing or cross-linking, wherein the polymer chains of the polymeric components are joined together by covalent bonds. This property is usually associated with a cross-linking reaction of the composition constituents often induced, for example, by heat or radiation. Curing or crosslinking reactions also may be carried out under ambient conditions. Once cured or crosslinked, a thermosetting resin will not melt upon the application of heat and is insoluble in solvents. In other embodiments, the film-forming resin included within the coating compositions of the present disclosure includes a thermoplastic resin. As used herein, the term "thermoplastic" refers to resins that comprise polymeric components that are not joined by covalent bonds and thereby can undergo liquid flow upon heating and are soluble in solvents.

Additional film-forming resins suitable for use in the coating compositions of the present disclosure include, for example, those formed from the reaction of a polymer having at least one type of reactive group and a curing agent having reactive groups reactive with the reactive group(s) of the polymer. As used herein, the term "polymer" is meant to encompass oligomers, and includes, without limitation, both homopolymers and copolymers. The polymers can be, for example, acrylic, saturated or unsaturated polyester, polyurethane or polyether, polyvinyl, cellulosic, acrylate, silicon-based polymers, co-polymers thereof, and mixtures thereof, and can contain reactive groups such as epoxy, carboxylic acid, hydroxyl, isocyanate, amide, carbamate and carboxylate groups, among others, including mixtures thereof.

The binder component may also include a curing agent. As used herein, the term "curing agent" refers to a material that promotes "cure" of coating composition components. As used herein, the term "cure" means that any crosslinkable components of the coating composition are at least partially crosslinked. In certain embodiments, the crosslink density of the crosslinkable components, i.e., the degree of crosslinking, ranges from 5 percent to 100 percent of complete crosslinking, such as 35 percent to 85 percent of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer. Any of a variety of curing agents known to those skilled in the art may be used. For example, aminoplast resins, phenoplast resins, polyisocyanates, blocked isocyanates, anhydrides, polyacids, polyols, polyamines, and combinations thereof may be used.

The film forming resin is present in an amount of from about 10 to about 40 parts by weight based on 100 parts by weight of the binder component. In various embodiments, the polymer is present in an amount of from about 15 to about 35, about 20 to about 30, or about 25 to about 30, parts by weight based on 100 parts by weight of the binder component. In other embodiments, the film forming resin is present in an amount of from about 10 to about 20, about 11 to about 19, about 12 to about 18, about 13 to about 17, about 14 to about 16, about 15 to about 16, about 12 to about 15, about 13 to about 17, or about 10, 11, 12, 13, 14, 15, 16, 17, 18, 19, or 20, parts by weight based on 100 parts by weight of the binder component. In various non-limiting embodiments, all values and ranges of values including and between those set forth above are expressly contemplated for use herein.

(A3) Acid:

The binder component also includes an acid. The acid may be any known in the art and may be organic or inorganic or a combination thereof. In various embodiments, the acid is chosen from tannic acid, gallic acid, phosphoric acid, phosphorous acid, citric acid, malonic acid, derivatives thereof, or a mixture thereof. Suitable derivatives include esters, amides, and/or metal complexes of such acids. In another embodiment, the acid is phosphoric acid. In another embodiment, the acid is tannic acid. In another embodiment, the acid is a combination of phosphoric acid and tannic acid.

Relative to tannic acid, tannins are extracted from various plants and trees which can be classified according to their chemical properties as (a) hydrolyzable tannins, (b) condensed tannins, and (c) mixed tannins containing both hydrolyzable and condensed tannins. Tannins useful in the present disclosure include those that contain a tannin extract from naturally occurring plants and trees, and are normally referred to as vegetable tannins. Suitable vegetable tannins include the crude, ordinary or hot-water-soluble condensed vegetable tannins, such as Quebracho, mimosa, mangrove, spruce, hemlock, gabien, wattles, catechu, uranday, tea, larch, myrobalan, chestnut wood, divi-divi, valonia, summac, chinchona, oak, etc. These vegetable tannins are not pure chemical compounds with known structures, but rather contain numerous components including phenolic moieties such as catechol, pyrogallol, etc., condensed into a complicated polymeric structure. In certain embodiments, the acid is a phosphoric acid, such as a 100 percent orthophosphoric acid, superphosphoric acid or the aqueous solutions thereof, such as a 70 to 90 percent phosphoric acid solution. In various non-limiting embodiments, all values and ranges of values including and between those set forth above are expressly contemplated for use herein.

The acid is present in an amount of from about 10 to about 30 parts by weight based on 100 parts by weight of the binder component. In various embodiments, the acid is present in an amount of from about 15 to about 25, or from about 20 to about 25, parts by weight based on 100 parts by weight of the binder component. In other embodiments, the acid is present in an amount of from about 10 to about 20, about 11 to about 19, about 12 to about 18, about 12 to about 15, about 13 to about 17, about 14 to about 16, about 15 to about 16, about 13 to about 17, or about 10, 11, 12, 13, 14, 15, 16, 17, 18, 19, or 20, parts by weight based on 100 parts by weight of the binder component. In various non-limiting embodiments, all values and ranges of values including and between those set forth above are expressly contemplated for use herein.

(A4) Functionalized Tri-Alkoxy Silane:

The binder component may also include an optional functionalized tri-alkoxy silane which typically functions as an adhesion promoter. The terminology "optionally" means that the functionalized tri-alkoxy silane may or may not be present. In various embodiments, the functionalized tri-alkoxy silane is present in an amount of from about 0 to about 10 parts by weight based on 100 parts by weight of the binder component. If the functionalized tri-alkoxy silane is utilized, it is present in an amount of from greater than zero to an amount of up to about 10 parts by weight based on 100 parts by weight of the binder component. In various embodiments, the functionalized tri-alkoxy silane is present in an amount of about 0.5, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, or about 10, parts by weight based on 100 parts by weight of the binder component. In other embodiments, the functionalized tri-alkoxy silane is present in an amount of about 3 to about 10, about 4 to about 9, about 5 to about 8, about 6 to about 7, about 4 to about 6, or about 3, 4, 5, 6, 7, 8, 9, or 10, parts by weight based on 100 parts by weight of the binder component. In various non-limiting embodiments, all values and ranges of values including and between those set forth above are expressly contemplated for use herein.

Various non-limiting examples of suitable functionalized tri-alkoxy silanes include methyltrimethoxysilane, methyltriethoxysilane, methyltrimethoxysilane, methyltripropoxysilane, methyltributoxysilane, ethyltrimethoxysilane, ethyltriethoxysilane, gamma-methacryloxypropyltrimethoxysilane, gamma-aminopropyltrimethoxysilane, gamma-aminopropyltriethoxysilane, gamma-mercaptopropyltrimethoxysilane, chloromethyltrimethoxysilane, chloromethylriethoxysilane, dimethyldiethoxysilane, gamma-chloropropylmethyldimethoxysilane, gamma-chloropropylmethyldiethoxysilane, tetramethoxysilane, tetraethoxysilane, tetra-n-propoxysilane, tetra-n-butoxysilane, glycidoxymethyltriethoxysilane, alpha-glycidoxyethyltrimethoxysilane, alpha-glycidoxyethyltriethoxysilane, beta-glycidoxyethyltrimethoxysilane, beta-glycidoxyethyltriethoxysilane, alpha.-glycidoxy-propyltrimethoxysilane, alpha-glycidoxypropyltriethoxysilane, beta-glycidoxypropyltrimethoxysilane, beta-glycidoxypropyltriethoxysilane, gamma-glycidoxypropyltrimethoxysilane, gamma-glycidoxypropylmethyldimethoxysilane, gamma-glycidoxy-propyldimethylethoxysilane, and combinations thereof. In one embodiment, the functionalized tri-alkoxy silane is gamma-glycidoxy-propyltrimethoxysilane.

In other embodiments, the functionalized tri-alkoxy silane is a dipodal silanes. Dipodal silanes are adhesion promoters that have intrinsic hydrolytic stabilities up to 10,000 times greater than conventional silanes. These products have a significant impact on substrate bonding and mechanical strength of many composite systems to include epoxy, urethane, epoxy/urethane hybrids, polysulfide, cyanoacrylate and silicone and may be utilized in water-borne, high solids and photo-active chemistries. Functional dipodal silanes and combinations of nonfunctional dipodal silanes with functional conventional silanes have significant impact on substrate bonding and possess enabling activity in many adhesive systems, particularly primer and aqueous immersion applications.

Various non-limiting embodiments are set forth below:

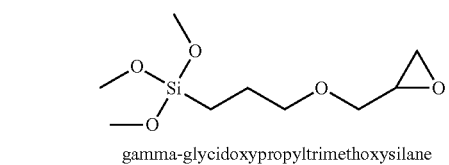

gamma-glycidoxypropyltrimethoxysilane

+

SIB1824.6

SIB1833.0

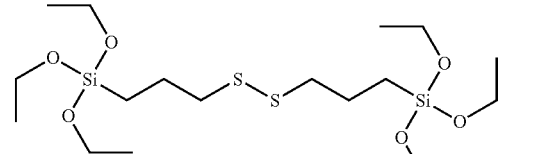

SIB1835.5

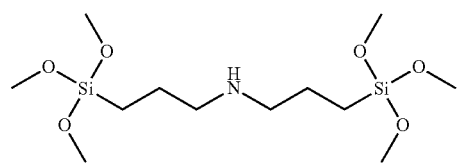

SIB1828.0

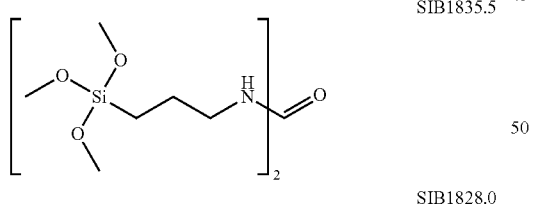

SIB1820.0

-continued

SIB1829.0

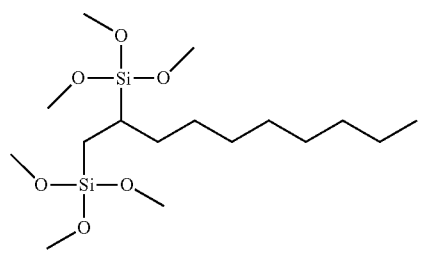

Non-functional Dipodal Silanes

SIB1831.0

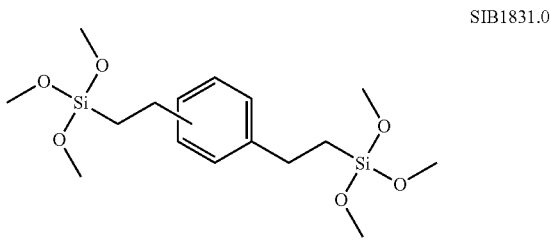

SIB829.2

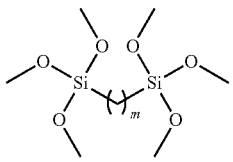

SIB1824.0

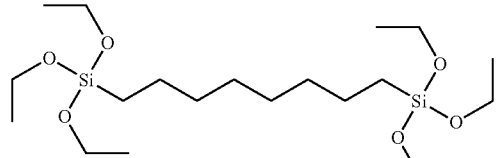

SIB1821.0

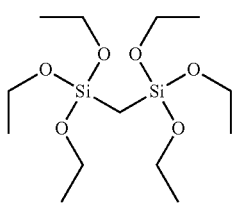

SIB1817.0

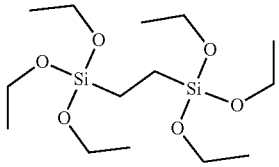

(A5) Polymeric Phosphate Ester:

The binder component may also include a polymeric phosphate ester. The polymeric phosphate ester is not particularly limited and may be any known in the art. For example, the polymeric phosphate ester may have a weight average molecular weight of from about 1000 to about 5000, about 1500 to about 4500, about 2000 to about 4000, about 2500 to about 3500, about 3000 to about 3500, or about 3500 to about 4000, g/mol. In other embodiments, the polymeric phosphate ester has a weight average molecular weight of about 3000, 3100, 3200, 3300, 3400, 3500, 3600, 3700, 3800, 3900, or 4000, g/mol. In other embodiments, the polymeric phosphate ester may have a number average molecular weight of from about 250 to about 2500, about 500 to about 2000, about 1000 to about 1500, about 1500 to about 2000, or about 1000, 1100, 1200, 1300, 1400, 1500, 1600, 1700, 1800, 1900, or 2000, g/mol. In various non-limiting embodiments, all values and ranges of values including and between those set forth above are expressly contemplated for use herein.

In various embodiments, the polymeric phosphate ester is a free acid of complex alkyl/aryl phosphate ester. In other embodiments, the polymeric phosphate ester is the reaction product of a Styrene/Allyl alcohol copolymer (SAA100 or SAA101), phosphoric acid, and t-amyl phenol. In one embodiment, the polymeric phosphate ester is commercially available as Lubrizol 2062.

The polymeric phosphate ester may be present in an amount of from about 3 to about 10 parts by weight based on 100 parts by weight of the binder component. In other embodiments, the polymeric phosphate ester is present in an amount of about 4 to about 9, about 5 to about 8, about 6 to about 7, or about 3, 4, 5, 6, 7, 8, 9, or 10, parts by weight based on 100 parts by weight of the binder component. In various non-limiting embodiments, all values and ranges of values including and between those set forth above are expressly contemplated for use herein.

(B) Pigment Component:

(B1) Calcium Ion-Exchanged Silica:

Referring back to the pigment component, the pigment component includes a calcium ion-exchanged silica. Any grade of calcium ion-exchanged silica may be utilized. The calcium ion-exchanged silica may be any known in the art including, but not limited to, calcium ion-exchanged silica that is commercially available from W. R. Grace & Co. as SHIELDEX® AC3 and/or SHIELDEX® C303. Other suitable calcium ion-exchanged silica is commercially available from PPG Industries as Inhibisil®. Still other suitable options include, but are not limited to, Sylomask SMK55 by Fuji Silysia; Wayncor 205, by WPC Technologies; LM-30 by Lingwe; and Heucosil CTF by Heubach.

The calcium ion-exchanged silica is present in an amount of from about 15 to about 100 parts by weight based on 100 parts by weight of the binder component. In various embodiments, calcium ion-exchanged silica is present in an amount of from about 20 to about 95, from about 25 to about 90, about 30 to about 85, about 35 to about 80, about 40 to about 75, about 45 to about 70, about 50 to about 65, or about 55 to about 60, parts by weight based on 100 parts by weight of the binder component. In other embodiments, the calcium ion-exchanged silica is present in an amount of from about 30 to about 40, about 31 to about 39, about 32 to about 38, about 33 to about 37, about 34 to about 36, about 35 to about 36, or about 35 to about 36, parts by weight based on 100 parts by weight of the binder component. In various non-limiting embodiments, all values and ranges of values including and between those set forth above are expressly contemplated for use herein.

(B2) Corrosion Inhibiting Pigment:

The pigment component can also include an optional corrosion inhibiting pigment. Any corrosion inhibiting pigment known in the art may be utilized such zinc phosphate. In other embodiments, double orthophosphates, in which one of the cations is represented by zinc can be used. For example, these may include Zn—Al, Zn—Ca, but also Zn—K, Zn—Fe, Zn—Ca—Sr or Ba—Ca and Sr—Ca combinations. It is possible to combine a phosphate anion with further anticorrosively efficient anions, such as silicate, molybdate, or borate. Modified phosphate pigments can be modified by organic corrosion inhibitors. Modified phosphate pigments can be exemplified by the following compounds: Aluminum(III) zinc(II) phosphate, Basic zinc phosphate, Zinc phosphomolybdate, Zinc calcium phosphomolybdate, Zinc borophosphate. Moreover, Zinc strontium phosphosilicate, Calcium barium phosphosilicate, Calcium strontium zinc phosphosilicate (Ca Sr Zn Phosphosilicate), and combinations thereof. Zinc 5-nitroisophthalate, Calcium 5-nitroisophthalate, Calcium cyanurate, metal salts of dinonylnaphthalene sulfonic acids, and combinations thereof can also be used. Additional examples are iron phosphate, colloidal silica, synthetic amorphous silica, and simpler molybdates such as calcium molybdate, zinc molybdate, barium molybdate and strontium molybdate. Suitable amorphous silica is available from W. R. Grace and Company under the trade name Syloid®.

The optional corrosion inhibiting pigment may be present in an amount of from about 0 to about 100 parts by weight based on 100 parts by weight of the binder component. The terminology "optionally" means that the corrosion inhibiting pigment may or may not be present. In various embodiments, the corrosion inhibiting pigment is present in an amount of from about 0 to about 100 parts by weight based on 100 parts by weight of the binder component. If the corrosion inhibiting pigment is utilized, it is present in an amount of from greater than zero to an amount of up to about 100 parts by weight based on 100 parts by weight of the binder component. In various embodiments, the corrosion inhibiting pigment is present in an amount of from about 5 to about 95, about 10 to about 90, about 15 to about 85, about 20 to about 80, about 25 to about 75, about 30 to about 70, about 35 to about 65, about 40 to about 60, about 45 to about 55, or about 45 to about 50, parts by weight based on 100 parts by weight of the binder component. In other embodiments, the corrosion inhibiting pigment is present in an amount of about 40 to about 50, about 41 to about 49, about 42 to about 48, about 43 to about 47, about 44 to about 46, or about 44 to about 45, or about 40, 41, 42, 43, 44, 45, 46, 47, 48, 49, or 50, parts by weight based on 100 parts by weight of the binder component. In various non-limiting embodiments, all values and ranges of values including and between those set forth above are expressly contemplated for use herein.

(B3) Polyalkylene Oxide Phosphate:

The pigment component may also include a polyalkylene oxide phosphate. The polyalkylene oxide phosphate may be further defined as a polyethylene oxide phosphate, polypropylene oxide phosphate, polybutylene oxide phosphate, or any combination of ethylene oxide, propylene oxide, and/or butylene oxide, in block or heteric copolymer structures. In various embodiments, the polyalkylene oxide phosphate is present in an amount of from about 1 to about 7 parts by weight based on 100 parts by weight of the binder component. For example, the polyalkylene oxide phosphate may be present in an amount of from about 2 to about 6, about 3 to about 5, about 4 to about 5, or about 1, 2, 3, 4, 5, 6, or 7, parts by weight based on 100 parts by weight of the binder component. In various non-limiting embodiments, all values and ranges of values including and between those set forth above are expressly contemplated for use herein.

In various embodiments, the polyalkylene oxide phosphate is polyethylene oxide terminated with one or more phosphate groups at any point in the polymer chain. In other embodiments, the polyalkylene oxide phosphate is combined with MPEG (e.g. MPEG 400) and/or polyethylene oxide with methyl groups on both end of the polyethylene oxide. Moreover, it is contemplated that the polyalkylene oxide phosphate may be combined with a nonionic surfactant. For example, this surfactant may have a high cloud point and an HLB of about 13, This surfactant may be Surfynol 465.

Additional Components:

The coating composition may also include one or more additional components in addition to the components described above. Alternatively, the coating composition may be free of one of these additional components described below. These additional components may be any known in the art of coating composition. For example, the one or more additional components may be chosen from color pigments, extender pigments, adhesion promoters, solvents, dispersants, etchants, rheology and flow additives, silicones, anti-settling agents, thickening agents, dyes, surface active agents, flow control agents, thixotropic agents, fillers, anti-gassing agents, organic co-solvents, catalysts, antioxidants, and other customary auxiliaries, and combinations thereof.

In one embodiment, the coating composition includes a solvent component that includes one or more solvents. Any solvent known in the art can be used including, but not limited to, propylene glycol methyl ether, n-butyl alcohol, isobutyl alcohol, xylene, aromatic hydrocarbons, and combinations thereof. In various embodiments, a total amount of solvent is present in an amount of from about 25 to about 95, about 30 to about 85, about 35 to about 80, about 40 to about 75, about 45 to about 70, about 50 to about 65, about 55 to about 60, or about 70 to about 90, parts by weight per 100 parts by weight of the coating composition. In other embodiments, individual solvents, such as any one or more of the aforementioned options, may be present in any one or more of the aforementioned amounts or in an amount, e.g. of from about 0.5 to about 30, about 0.5 to about 1, about 1 to about 30, about 1 to about 5, about 5 to about 10, about 10 to about 15, about 15 to about 20, about 20 to about 25, or about 25 to about 30, parts by weight per 100 parts by weight of the coating composition. In various non-limiting embodiments, all values and ranges of values including and between those set forth above are expressly contemplated for use herein.

In various embodiments, the coating composition includes one or more adhesion promoters. In other embodiments, the coating composition includes one or more color pigments. Any color pigments known in the art can be used including, but not limited to, carbon black, iron oxide red, titanium dioxide, iron oxide yellow, and combinations thereof. For purposes of this disclosure, these color pigments are different from the calcium ion-exchanged silica described above and the optional corrosion inhibiting pigments described above. In various embodiments, the color pigment is present in an amount of from about 4.5 to about 45, about 9 to about 40.5, about 13.5 to about 36, about 18 to about 31.5, or about 22.5 to about 27, parts by weight per 100 parts by weight of the binder component. In various non-limiting embodiments, all values and ranges of values including and between those set forth above are expressly contemplated for use herein.

In other embodiments, the coating composition includes one or more extender pigments. Any extender pigments known in the art can be used including, but not limited to, amorphous silica, talc, and combinations thereof. For purposes of this disclosure, these extender pigments are different from the color pigments, calcium ion-exchanged silica described above and the optional corrosion inhibiting pigments described above. In various embodiments, the extender pigment is present in an amount of from about 4.5 to about 45, about 9 to about 40.5, about 13.5 to about 36, about 18 to about 31.5, or about 22.5 to about 27, parts by weight per 100 parts by weight of the binder component. In various non-limiting embodiments, all values and ranges of values including and between those set forth above are expressly contemplated for use herein.

In other embodiments, the coating composition includes one or more dispersants. Any dispersant known in the art can be used including, but not limited to, Efka FA4600. In various embodiments, the dispersant is present in an amount of from about 1 to about 10, about 2 to about 9, about 3 to about 8, about 4 to about 7, or about 5 to about 6, parts by weight per 100 parts by weight of the binder component. In various non-limiting embodiments, all values and ranges of values including and between those set forth above are expressly contemplated for use herein.

In various embodiments, the coating composition can be partitioned into two parts, e.g. Part A and Part B. These parts may be combined before use of the coating composition, e.g. up to about 8 hours before use. In various non-limiting embodiments, all values and ranges of values including and between those set forth above are expressly contemplated for use herein.

In certain embodiments, the coating compositions of the present disclosure are formulated as a one-component composition where a curing agent is admixed with other composition components to form a storage stable composition. In other embodiments, compositions of the present disclosure can be formulated as a two-component composition where a curing agent is added to a pre-formed admixture of the other composition components just prior to application. To be clear, curing agents are not required herein.

In one additional embodiment, the solvent component is present in an amount of from about 70 to about 90 parts by weight per 100 parts by weight of the coating composition. In another embodiment, the polyvinyl butyral is present in an amount of from about 55 to about 65 parts by weight based on 100 parts by weight of the binder component. In another embodiment, the film forming resin is present in an amount of from about 10 to about 40 parts by weight based on 100 parts by weight of the binder component. In a further embodiment, the acid is present in an amount of from about 15 to about 25 parts by weight based on 100 parts by weight of the binder component. In another embodiment, the functionalized tri-alkoxy silane is present in an amount of from about 3 to about 7 parts by weight based on 100 parts by weight of the binder component. In still another embodiment, the calcium ion-exchanged silica is present in an amount of from about 20 to about 40 parts by weight based on 100 parts by weight of the binder component. In a further embodiment, the corrosion inhibiting pigment is present in an amount of from about 40 to about 60 parts by weight based on 100 parts by weight of the binder component. In an additional embodiment, the coating composition includes an extender pigment present in an amount of from about 20 to about 30 parts by weight based on 100 parts by weight of the binder component. In another embodiment, the coating composition includes a color pigment present in an amount of from about 25 to about 35 parts by weight based on 100 parts by weight of the binder component. In a further embodiment, the coating composition includes a dispersant present in an amount of from about 1 to about 5 parts by weight based on 100 parts by weight of the binder component. In a further embodiment, the polyvinyl butyral is present in an amount of from about 55 to about 65 parts by weight based on 100 parts by weight of the binder component, the film forming resin is present in an amount of from about 10 to about 40 parts by weight based on 100 parts by weight of the binder component, the acid is present in an amount of from about 15 to about 25 parts by weight based on 100 parts by weight of the binder component, the functionalized tri-alkoxy silane is present in an amount of from about 3 to about 7 parts by weight based on 100 parts by weight of the binder component, the calcium ion-exchanged silica is present in an amount of from about 20 to about 40 parts by weight based on 100 parts by weight of the binder component, and the corrosion inhibiting pigment is present in an amount of from about 40 to about 60 parts by weight based on 100 parts by weight of the binder component. In various non-limiting embodiments, all values and ranges of values including and between those set forth above are expressly contemplated for use herein.

In certain embodiments, the coating compositions of the present disclosure are in the form of liquid coating compositions, examples of which include aqueous and solvent-based coating compositions. Regardless of the form, the coating compositions of the present disclosure may be used alone or in combination with e-coats, basecoats, or topcoats. The coating composition may be described as an etch primer and/or a metal substrate pretreatment coating composition. The coating composition may be deposited onto a substrate in order to prepare the surface for application of a protective or decorative coating system. Metal substrates that may be coated with such compositions include, for example, substrates including steel (including electrogalvanized steel, cold rolled steel, hot-dipped galvanized steel, among others), aluminum, aluminum alloys, zinc-aluminum alloys, and aluminum plated steel. Substrates that may be coated with such compositions also may comprise more than one metal or metal alloy, in that the substrate may be a combination of two or more metal substrates assembled together, such as hot-dipped galvanized steel assembled with aluminum substrates.

The coating compositions of the present disclosure may be applied to bare metal. By "bare" is meant a virgin material that has not been treated with any pretreatment compositions, such as, for example, conventional phosphating baths, toxic metal rinses, etc. Additionally, bare metal substrates being coated with the coating compositions may be a cut edge of a substrate that is otherwise treated and/or coated over the rest of its surface.

Before applying a coating composition, the metal substrate may first be cleaned to remove grease, dirt, or other extraneous matter. Conventional cleaning procedures and materials may be employed. These materials could include, for example, solvent based or alkaline cleaners, such as those that are commercially available. Examples include Axalta's 3900S, 3901S, 3909S, 3919S, V-39215 and 3939S cleaners. The application of such cleaners may be followed and/or preceded by a water rinse.

The metal surface may then be rinsed with an aqueous acidic solution after cleaning with the alkaline cleaner and before contact with a metal substrate coating composition. Examples of suitable rinse solutions include mild or strong acidic cleaners, such as Axalta's Cromax™ 225 S aluminum metal cleaner and 5717S metal conditioner.

The coating compositions of the present disclosure may be prepared by any of a variety of methods. For example, any one or more components may be mixed with any one or more other components. All orders of addition are hereby expressly contemplated for use herein in various non-limiting embodiments. Any one or more combinations of components may be subjected to high shear stress conditions, such as by shaking the blend on a high speed shaker, until a homogeneous solution or dispersion is formed. If desired, any mode of applying stress can be utilized.

The coating compositions of the present disclosure may be applied to a substrate by any known application technique, such as dipping or immersion, spraying, intermittent spraying, dipping followed by spraying, spraying followed by dipping, brushing, or by roll-coating. Typical spray techniques and equipment for air spraying and electrostatic spraying, either manual or automatic methods, can be used. While the coating compositions of the present disclosure can be applied to various substrates, such as wood, glass, cloth, plastic, foam, including elastomeric substrates and the like, in many cases, the substrate includes a metal.

In certain embodiments of the coating compositions of the present disclosure, after application of the composition to the substrate, a film is formed on the surface of the substrate by driving solvent, i.e., organic solvent and/or water, out of the film by heating or by an air-drying period. Suitable drying conditions will depend on the particular composition and/or application, but in some instances a drying time of from about 1 to 5 minutes at a temperature of about 50 to about 250° F., i.e., about 10 to about 121° C., will be sufficient. More than one coating layer may be applied if desired. Usually between coats, the previously applied coat is flashed; that is, exposed to ambient conditions for 5 to 30 minutes. In certain embodiments, the thickness of the coating is from 0.05 to 3 mils, e.g. about 0.5 to about 1.5 mils. The coating composition may then be heated. In the curing operation, solvents are driven off and crosslinkable components of the composition, if any, are crosslinked. The heating and curing operation is sometimes carried out at a temperature in the range of from about 160 to about 350° F., i.e., about 71 to about 177° C.) Lower or higher temperatures may be used. In various non-limiting embodiments, all values and ranges of values including and between those set forth above are expressly contemplated for use herein.

In various embodiments, the coating composition may be topcoated with a protective and decorative coating system, such as a monocoat topcoat or a combination of a pigmented basecoat composition and a clearcoat composition, i.e., a color-plus-clear system. As a result, the present disclosure is also directed to multi-component composite coatings including at least one coating layer deposited from a coating composition of the present disclosure.

In various embodiments, the coating composition is further defined as an automotive OEM coating composition, an automotive refinish coating composition, an industrial coating composition, an architectural coating composition, a coil coating composition, or an aerospace coating composition, among others.

The present disclosure is also directed to substrates, such as metal substrates, at least partially coated with a coating composition of the present disclosure. In many cases, the coating compositions of the present disclosure, when deposited onto at least a portion of one metal substrate selected from cold rolled steel, electrogalvanized steel and aluminum and cured, produce a substrate that exhibits corrosion resistance properties greater than the corrosion resistance properties the same substrate exhibits when at least partially coated under the same conditions with a comparative coating composition.

As used herein, the term "corrosion resistance properties" refers to the measurement of corrosion prevention on a metal substrate utilizing the test described in ASTM B117 (Salt Spray Test). In this test, the coated substrate is scribed with a knife to expose the bare metal substrate. The scribed substrate is placed into a test chamber where an aqueous salt solution is continuously misted onto the substrate. The chamber is maintained at a constant temperature. The coated substrate is exposed to the salt spray environment for a specified period of time, such as 500 or 1000 hours. After exposure, the coated substrate is removed from the test chamber and evaluated for corrosion along the scribe. Corrosion is measured by "scribe creep", which is defined as the total distance the corrosion has traveled across the scribe measured in millimeters.

When it is stated that a substrate "exhibits corrosion resistance properties greater than" another substrate, it means that the substrate exhibits less scribe creep (the corrosion travels across the scribe fewer millimeters) compared to the other substrate. As used herein, the term "the same conditions" means that a coating composition is (i) deposited on the substrate at the same or similar film thickness as the composition to which it is being compared, and (ii) cured or dried under the same or similar cure conditions, such as cure temperature, humidity, and time, as the composition to which it is being compared.

In many cases, the coating compositions of the present disclosure, when deposited onto at least a portion of a metal substrate selected from cold rolled steel, electrogalvanized steel and aluminum and cured, produce a substrate that exhibits corrosion resistance properties similar to, or, in some cases, greater than, the corrosion resistance properties the same substrate exhibits when at least partially coated under the same conditions with a conventional chrome-containing corrosion-resistant composition.

In this application, when it is stated that a substrate "exhibits corrosion resistance properties similar to" another substrate, it means that the substrate exhibits scribe creep as measured by ASTM B117 as described above no more than 10% greater than the substrate to which it is being compared. As used herein, the term "conventional chrome-containing corrosion-resistant composition" refers to coating compositions that are commercially available.

First Additional Embodiments

In additional embodiments, as described below, it is expressly contemplated that any one or more components, method steps, amounts, ranges, etc. may be as described below or may be any as described above. For example one or more of (A1), (A2), (A3), (A4), (A5), (B1), (B2), and/or (B3) in any of the embodiments, or numerical amounts or ranges thereof, as set forth below may be substituted for any one or more of (A1), (A2), (A3), (A4), (A5), (B1), (B2), and/or (B3), respectively, as described above, in any one or more embodiments described above.

Furthermore, relative to all embodiments below, it is expressly contemplated that all values and ranges of values including and between those set forth below can be used herein in various non-limiting embodiments.

Moreover, it is expressly contemplated that the language including, consisting essentially of, and consisting of, may apply to any one or more embodiments above or below. Typically, the language consisting essentially of describes embodiments that are free of, or include less than 10, 5, 4, 3, 2, 1, 0.5, or 0.1, weight percent (based on a total weight of the binder component, the pigment component, or the coating composition as a whole) of one or more binder components that are not contemplated herein, polymers that are not contemplated herein, acids not contemplated herein, silanes or silicones not contemplated herein, silicas not contemplated herein, pigments not contemplated herein, phosphates not contemplated herein, chromium compounds, polyalkylene oxide polymers or copolymers not contemplated herein, etc. Moreover, any optional compound described herein may be excluded from any one or more embodiments that utilize the language including, including, or consisting essentially of. It is contemplated that the coating composition may be, include, comprise, consist essentially of, or consist of, (A) the binder component and (B) the pigment component.

It is also contemplated that the coating composition may be, include, comprise, consist essentially of, or consist of, (A) the binder component and (B) the pigment component and any other optional component described herein.

It is also contemplated that the coating composition may be, include, comprise, consist essentially of, or consist of, (A) the binder component and (B) the pigment component and any other optional component described herein, wherein (A) and (B) themselves may be, include, comprise, consist essentially of, or consist of, (A1), (A2), (A3), and/or (A4) and/or (A5), along with (B1), (B2), and (B3), respectively.

In one embodiment, the disclosure provides a coating composition including:

A. a binder component including;
  (1) polyvinyl butyral present in an amount of from about 30 to about 70 parts by weight based on 100 parts by weight of said binder component;
  (2) a film forming resin that is Poly(Bisphenol A-Co-Epichlorohydrin) Glycidyl End-Capped and that is present in an amount of from about 10 to about 40 parts by weight based on 100 parts by weight of said binder component;
  (3) an acid present in an amount of from about 10 to about 30 parts by weight based on 100 parts by weight of said binder component; and
  (4) a functionalized tri-alkoxy silane present in an amount of from about 3 to about 10 parts by weight based on 100 parts by weight of said binder component; and B. a pigment component including;
  (1) a calcium ion-exchanged silica present in an amount of from about 30 to about 40 parts by weight based on 100 parts by weight of said binder component;
  (2) a corrosion inhibiting pigment present in an amount of from about 40 to about 50 parts by weight based on 100 parts by weight of said binder component; and
  (3) a polyalkylene oxide phosphate present in an amount of from about 1 to about 7 parts by weight based on 100 parts by weight of said binder component.

In another embodiment, the coating composition consists essentially of (A)(1)-(A)(4) and (B)(1)-(B)(3). In another embodiment, the coating composition consists essentially of (A)(1)-(A)(4) and (B)(1)-(B)(3) e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component.

In a further embodiment, the coating composition consists of (A)(1)-(A)(4) and (B)(1)-(B)(3). In a further embodiment, the coating composition consists of (A)(1)-(A)(4) and (B)(1)-(B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component.

This disclosure also provides a method of forming the coating composition including the step of combining (A)(1), (A)(2), (A)(3), (A)(4), (B)(1), (B)(2), and (B)(3).

In one embodiment the polyvinyl butyral is present in an amount of from about 60 to about 65 parts by weight based on 100 parts by weight of said binder component.

In another embodiment, the film forming resin is present in an amount of from about 13 to about 17 parts by weight based on 100 parts by weight of said binder component.

In another embodiment, the acid is present in an amount of from about 12 to about 15 parts by weight based on 100 parts by weight of said binder component.

In another embodiment, the acid is phosphoric acid.

In another embodiment, the functionalized tri-alkoxy silane is present in an amount of from about 4 to about 6 parts by weight based on 100 parts by weight of said binder component.

In another embodiment, the functionalized tri-alkoxy silane is gamma-glycidoxypropyltrimethoxysiliane.

In another embodiment, the calcium ion-exchanged silica is present in an amount of from about 30 to about 35 parts by weight based on 100 parts by weight of said binder component.

In another embodiment, the corrosion inhibiting pigment is present in an amount of from about 45 to about 50 parts by weight based on 100 parts by weight of said binder component.

In another embodiment, the corrosion inhibiting pigment is Ca Sr Zn Phosphosilicate.

In another embodiment, the polyalkylene oxide phosphate is present in an amount of from about 2 to about 5 parts by weight based on 100 parts by weight of said binder component.

In another embodiment, the polyalkylene oxide phosphate is polyethylene oxide terminated with a phosphate group.

In another embodiment, the polyalkylene oxide phosphate, which is polyethylene oxide terminated with a phosphate group is mixed with additional components: polyethylene oxide terminated on one or both ends with methyl groups and an acetylenic diol modified with polyethylene oxide side chains.

In another embodiment, the polyvinyl butyral is present in an amount of from about 60 to about 65 parts by weight based on 100 parts by weight of said binder component; the film forming resin is present in an amount of from about 13 to about 17 parts by weight based on 100 parts by weight of said binder component; the acid is phosphoric acid and is present in an amount of from about 12 to about 15 parts by weight based on 100 parts by weight of said binder component; the functionalized tri-alkoxy silane is gamma-glycidoxypropyltrimethoxysiliane and is present in an amount of from about 3 to about 10 parts by weight based on 100 parts by weight of said binder component; the calcium ion-exchanged silica is present in an amount of from about 30 to about 35 parts by weight based on 100 parts by weight of said binder component; the corrosion inhibiting pigment is Ca Sr Zn Phosphosilicate and is present in an amount of from about 45 to about 50 parts by weight based on 100 parts by weight of said binder component; and the polyalkylene oxide phosphate is polyethylene oxide terminated with a phosphate group and is present in an amount of from about 2 to about 5 parts by weight based on 100 parts by weight of said binder component.

In another embodiment, the polyvinyl butyral is present in an amount of about 63 parts by weight based on 100 parts by weight of said binder component; the film forming resin is present in an amount of about 16 parts by weight based on 100 parts by weight of said binder component; the acid is phosphoric acid and is present in an amount of about 14 parts by weight based on 100 parts by weight of said binder component; the functionalized tri-alkoxy silane is gamma-glycidoxypropyltrimethoxysiliane and is present in an amount of about 5 parts by weight based on 100 parts by weight of said binder component; the calcium ion-exchanged silica is present in an amount of about 33 parts by weight based on 100 parts by weight of said binder component; the corrosion inhibiting pigment is Ca Sr Zn Phosphosilicate and is present in an amount of about 46 parts by weight based on 100 parts by weight of said binder component; and the polyalkylene oxide phosphate is polyethylene oxide terminated with a phosphate group and is present in an amount of about 2 parts by weight based on 100 parts by weight of said binder component.

Second Additional Embodiments

In additional embodiments, as described below, it is expressly contemplated that any one or more components, method steps, amounts, ranges, etc. may be as described below or may be any as described above. For example one or more of (A1), (A2), (A3), (A4), (A5), (B1), (B2), and/or (B3) in any of the embodiments, or numerical amounts or ranges thereof, as set forth below may be substituted for any one or more of (A1), (A2), (A3), (A4), (A5), (B1), (B2), and/or (B3), respectively, as described above, in any one or more embodiments described above. Moreover, it is expressly contemplated that the language including, consisting essentially of, and consisting of, may apply to any one or more embodiments below.

In another embodiment, the coating composition includes:
  A. a binder component including;
    (1) polyvinyl butyral present in an amount of from about 30 to about 70 parts by weight based on 100 parts by weight of said binder component;
    (2) a film forming resin that is Poly[(Phenyl Glycidyl Ether)-Co-Formaldehyde] and that is present in an amount of from about 10 to about 40 parts by weight based on 100 parts by weight of said binder component;
    (3) an acid present in an amount of from about 10 to about 30 parts by weight based on 100 parts by weight of said binder component; and
    (4) a functionalized tri-alkoxy silane present in an amount of from about 3 to about 10 parts by weight based on 100 parts by weight of said binder component; and
  B. a pigment component including;
    (1) a calcium ion-exchanged silica present in an amount of from about 30 to about 40 parts by weight based on 100 parts by weight of said binder component;
    (2) a corrosion inhibiting pigment present in an amount of from about 40 to about 50 parts by weight based on 100 parts by weight of said binder component; and
    (3) a polyalkylene oxide phosphate present in an amount of from about 1 to about 7 parts by weight based on 100 parts by weight of said binder component.

In another embodiment, the polyvinyl butyral is present in an amount of from about 60 to about 65 parts by weight based on 100 parts by weight of said binder component.

In another embodiment, the film forming resin is present in an amount of from about 13 to about 17 parts by weight based on 100 parts by weight of said binder component.

In another embodiment, the acid is present in an amount of from about 12 to about 15 parts by weight based on 100 parts by weight of said binder component.

In another embodiment, the acid is phosphoric acid.

In another embodiment, the functionalized tri-alkoxy silane is present in an amount of from about 4 to about 6 parts by weight based on 100 parts by weight of said binder component.

In another embodiment, the functionalized tri-alkoxy silane is gamma-glycidoxypropyltrimethoxysiliane.

In another embodiment, the calcium ion-exchanged silica is present in an amount of from about 30 to about 35 parts by weight based on 100 parts by weight of said binder component.

In another embodiment, the corrosion inhibiting pigment is present in an amount of from about 45 to about 50 parts by weight based on 100 parts by weight of said binder component.

In another embodiment, the corrosion inhibiting pigment is Ca Sr Zn Phosphosilicate.

In another embodiment, the polyalkylene oxide phosphate is present in an amount of from about 2 to about 5 parts by weight based on 100 parts by weight of said binder component.

In another embodiment, the polyalkylene oxide phosphate is polyethylene oxide terminated with a phosphate group.

In another embodiment, the coating composition consists essentially of (A)(1)-(A)(4) and (B)(1)-(B)(3). In another embodiment, the coating composition consists essentially of (A)(1)-(A)(4) and (B)(1)-(B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component.

In a further embodiment, the coating composition consists of (A)(1)-(A)(4) and (B)(1)-(B)(3). In a further embodiment, the coating composition consists of (A)(1)-(A)(4) and (B)(1)-(B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component.

In another embodiment, the polyvinyl butyral is present in an amount of from about 60 to about 65 parts by weight based on 100 parts by weight of said binder component; the film forming resin is present in an amount of from about 13 to about 17 parts by weight based on 100 parts by weight of said binder component; the acid is phosphoric acid and is present in an amount of from about 12 to about 15 parts by weight based on 100 parts by weight of said binder component; the functionalized tri-alkoxy silane is gamma-glycidoxypropyltrimethoxysiliane and is present in an amount of from about 4 to about 6 parts by weight based on 100 parts by weight of said binder component; the calcium ion-exchanged silica is present in an amount of from about 30 to about 35 parts by weight based on 100 parts by weight of said binder component; the corrosion inhibiting pigment is Ca Sr Zn Phosphosilicate and is present in an amount of from about 45 to about 50 parts by weight based on 100 parts by weight of said binder component; and the polyalkylene oxide phosphate is polyethylene oxide terminated with a phosphate group and is present in an amount of from about 2 to about 5 parts by weight based on 100 parts by weight of said binder component.

In another embodiment, the polyvinyl butyral is present in an amount of about 64 parts by weight based on 100 parts by weight of said binder component; the film forming resin is present in an amount of about 15 parts by weight based on 100 parts by weight of said binder component; the acid is phosphoric acid and is present in an amount of about 14 parts by weight based on 100 parts by weight of said binder component; the functionalized tri-alkoxy silane is gamma-glycidoxypropyltrimethoxysiliane and is present in an amount of about 5 parts by weight based on 100 parts by weight of said binder component; the calcium ion-exchanged silica is present in an amount of about 34 parts by weight based on 100 parts by weight of said binder component; the corrosion inhibiting pigment is Ca Sr Zn Phosphosilicate and is present in an amount of about 47 parts by weight based on 100 parts by weight of said binder component; and the polyalkylene oxide phosphate is polyethylene oxide terminated with a phosphate group and is present in an amount of about 2 parts by weight based on 100 parts by weight of said binder component.

In a further embodiment, the coating composition consists of (A)(1)-(A)(4) and (B)(1)-(B)(3). In a further embodiment, the coating composition consists of (A)(1)-(A)(4) and (B)(1)-(B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component.

In another embodiment, the disclosure provides a method of forming the coating composition including the step of combining (A)(1), (A)(2), (A)(3), (A)(4), (B)(1), (B)(2), and (B)(3).

In another embodiment, the disclosure provides a method including the step of applying the coating composition to a metal substrate.

Third Additional Embodiments

In additional embodiments, as described below, it is expressly contemplated that any one or more components, method steps, amounts, ranges, etc. may be as described below or may be any as described above. For example one or more of (A1), (A2), (A3), (A4), (A5), (B1), (B2), and/or (B3) in any of the embodiments, or numerical amounts or ranges thereof, as set forth below may be substituted for any one or more of (A1), (A2), (A3), (A4), (A5), (B1), (B2), and/or (B3), respectively, as described above, in any one or more embodiments described above. Moreover, it is expressly contemplated that the language including, consisting essentially of, and consisting of, may apply to any one or more embodiments below.

In another embodiment, the coating composition includes
A. a binder component including;
(1) polyvinyl butyral present in an amount of from about 30 to about 70 parts by weight based on 100 parts by weight of said binder component;
(2) a film forming resin that is Poly(Bisphenol A-Co-Epichlorohydrin) Glycidyl End-Capped and that is present in an amount of from about 10 to about 40 parts by weight based on 100 parts by weight of said binder component;
(3) an acid present in an amount of from about 10 to about 30 parts by weight based on 100 parts by weight of said binder component; and
(5) a polymeric phosphate ester present in an amount of from about 3 to about 10 parts by weight based on 100 parts by weight of said binder component; and B. a pigment component including;
(1) a calcium ion-exchanged silica present in an amount of from about 30 to about 40 parts by weight based on 100 parts by weight of said binder component;
(2) a corrosion inhibiting pigment present in an amount of from about 40 to about 50 parts by weight based on 100 parts by weight of said binder component; and
(3) a polyalkylene oxide phosphate present in an amount of from about 1 to about 7 parts by weight based on 100 parts by weight of said binder component.

In another embodiment, the polyvinyl butyral is present in an amount of from about 60 to about 65 parts by weight based on 100 parts by weight of said binder component.

In another embodiment, the film forming resin is present in an amount of from about 13 to about 17 parts by weight based on 100 parts by weight of said binder component.

In another embodiment, the acid is present in an amount of from about 12 to about 15 parts by weight based on 100 parts by weight of said binder component.

In another embodiment, the acid is phosphoric acid.

In another embodiment, the polymeric phosphate ester is present in an amount of from about 4 to about 8 parts by weight based on 100 parts by weight of said binder component.

In another embodiment, the polymeric phosphate ester is the reaction product of a styrene/allyl alcohol copolymer, phosphoric acid, and t-amyl phenol.

In another embodiment, the calcium ion-exchanged silica is present in an amount of from about 30 to about 35 parts by weight based on 100 parts by weight of said binder component.

In another embodiment, the corrosion inhibiting pigment is present in an amount of from about 45 to about 50 parts by weight based on 100 parts by weight of said binder component.

In another embodiment, the corrosion inhibiting pigment is Ca Sr Zn Phosphosilicate.

In another embodiment, the polyalkylene oxide phosphate is present in an amount of from about 2 to about 5 parts by weight based on 100 parts by weight of said binder component.

In another embodiment, the polyalkylene oxide phosphate is polyethylene oxide terminated with a phosphate group.

In another embodiment, the coating composition consists essentially of (A)(1), (A)(2), (A)(3), (A)(5), (B)(1), (B)(2), and (B)(3). In another embodiment, the coating composition consists essentially of (A)(1), (A)(2), (A)(3), (A)(5), (B)(1), (B)(2), and (B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component.

In another embodiment, the polyvinyl butyral is present in an amount of from about 60 to about 65 parts by weight based on 100 parts by weight of said binder component; the film forming resin is present in an amount of from about 13 to about 17 parts by weight based on 100 parts by weight of said binder component; the acid is phosphoric acid and is present in an amount of from about 12 to about 15 parts by weight based on 100 parts by weight of said binder component; the polymeric phosphate ester is the reaction product of a styrene/allyl alcohol copolymer, phosphoric acid, and t-amyl phenol and is present in an amount of from about 5 to about 7 parts by weight based on 100 parts by weight of said binder component; the calcium ion-exchanged silica is present in an amount of from about 30 to about 35 parts by weight based on 100 parts by weight of said binder component; the corrosion inhibiting pigment is Ca Sr Zn Phosphosilicate and is present in an amount of from about 45 to about 50 parts by weight based on 100 parts by weight of said binder component; and the polyalkylene oxide phosphate is polyethylene oxide terminated with a phosphate group and is present in an amount of from about 2 to about 5 parts by weight based on 100 parts by weight of said binder component.

In another embodiment, the polyvinyl butyral is present in an amount of about 62 parts by weight based on 100 parts by weight of said binder component; the film forming resin is present in an amount of about 16 parts by weight based on 100 parts by weight of said binder component; the acid is phosphoric acid and is present in an amount of about 14 parts by weight based on 100 parts by weight of said binder component; the polymeric phosphate ester is the reaction product of a styrene/allyl alcohol copolymer, phosphoric acid, and t-amyl phenol and is present in an amount of about 6 parts by weight based on 100 parts by weight of said binder component; the calcium ion-exchanged silica is present in an amount of about 33 parts by weight based on 100 parts by weight of said binder component; the corrosion inhibiting pigment is Ca Sr Zn Phosphosilicate and is present in an amount of about 46 parts by weight based on 100 parts by weight of said binder component; and the polyalkylene oxide phosphate is polyethylene oxide terminated with a phosphate group and is present in an amount of about 2 parts by weight based on 100 parts by weight of said binder component.

In another embodiment, the coating composition consists of (A)(1), (A)(2), (A)(3), (A)(5), (B)(1), (B)(2), and (B)(3). In another embodiment, the coating composition consists of (A)(1), (A)(2), (A)(3), (A)(5), (B)(1), (B)(2), and (B)(3), e.g. wherein (A1) is present in an amount of about 60 to about 70 parts by weight based on 100 parts by weight of the binder component, (A2) is present in an amount of about 10 to about 20 parts by weight based on 100 parts by weight of the binder component, and/or (A3) is present in an amount of about 10 to about 20 parts by weight based on 100 parts by weight of the binder component.

In another embodiment, the disclosure provides a method of forming the coating composition including the step of combining (A)(1), (A)(2), (A)(3), (A)(5), (B)(1), (B)(2), and (B)(3).

In another embodiment, the disclosure provides a method including the step of applying the coating composition to a metal substrate.

Evaluation of Physical Properties:

It is also contemplated that any one or more of the following standardized tests, or their equivalents as appreciated by one of skill in the art, may be used to evaluate one or more physical properties of the coating composition either alone or after application to a substrate.

DIN EN ISO 9227: Corrosion tests in artificial atmospheres—Salt spray tests (neutral salt spray (ASTM B117) for cold rolled steel (CRS) and galvanized steel; acetic acid salt spray for aluminum alloys)

VDA 233-102: Cyclic corrosion testing of materials and components in automotive construction DIN EN ISO 4623-1: Paints and varnishes—Determination of resistance to filiform corrosion—Part 1: Steel substrate (ISO 4623-1:2000)

DIN EN ISO 4623-2: Determination of resistance to filiform corrosion—Part 2: Aluminum substrates DIN EN ISO 4628-10: Paints and varnishes—Evaluation of degradation of coatings—Designation of quantity and size of defects, and of intensity of uniform changes in appearance—Part 10: Assessment of degree of filiform corrosion DIN EN ISO 6270-2: Determination of resistance to humidity ASTM D714-02: Standard Test Method for Evaluating Degree of Blistering of Paints DIN EN ISO 2409: Cross-cut test (Adhesion)

Examples

Six coating compositions are evaluated herein. The first two coating compositions are comparative composition. Comparative Composition 1 is a chromated composition. Comparative Composition 2 is a non-chromated composition. The next four coating compositions are inventive coating composition. These compositions are Inventive Compositions 1, 2, 3, 4 and 5. Each of the seven compositions is set forth below.

Comparative Composition 1:
Binder Component:

| Component | Component | Parts | Wt percent based on 100 pts binder |
|---|---|---|---|
| A1 | PVB | 6.005 | 6.005/11.218 = 53.5 wt % |
| A2 | Phenolic resin | 2.189 | 2.189/11.218 = 19.5 wt % |
| A3 | Phosphoric Acid | 2.926 | 2.926/11.218 = 26.1 wt % |
| A4 | NONE | NONE | NONE |
| A5 | NONE | NONE | NONE |
| | Total of Binder | 11.218 | |

Pigment Component:

| Component | Component | Parts | Wt percent based on 100 pts binder |
|---|---|---|---|
| | Zn, Sr, Ba Chromate | 7.56 | 7.56/11.218 = 67.4 wt % |
| | Anionic surfactant | 0.098 | 0.098/11.218 = 0.9 wt % |
| | Total of Binder | 11.218 | |

The Phenolic resin is a curable resin used as a binder for shop and wash primers. It has excellent pigment wetting properties.

The Anionic surfactant works following ionization. When added to water, the anionic surfactants ionize and have a negative charge. The negatively charged surfactants bind to positively charged particles. It is a blend of 35.5% anionic surfactant, 27.5% 1-Butanol, 1% Sodium bisulfite and 36% water. Anionic surfactant functions as an anti-settling agent for non-aqueous paints. As a modern anti-settling agent, it acts via adsorption phenomena on the pigment surface and effectively prevents pigments from settling and forming hard, difficult-to-stir sediments even in low-viscosity coatings such as, e.g., dipping paints and wash-primers. It is effective over a broad range of polarity. In addition, the uniform electrostatic charge imparted by the anionic surfactant prevents re-agglomeration thereby counteracting any premature settling of the pigments.

Comparative Composition 2:
Binder Component:

| Component | Component | Parts | Wt percent based on 100 pts binder |
|---|---|---|---|
| A1 | PVB | 3.805 | 3.805/9.633 = 39.5 wt % |
| A2 | Poly (Bisphenol A-Co-Epichlorohydrin) Glycidyl End-Capped | 3.528 | 3.528/9.633 = 36.6 wt % |
| A3 | Phosphoric Acid | 2.204 | 2.204/9.633 = 22.9 wt % |
| A4 | NONE | NONE | NONE |
| A5 | NONE | NONE | NONE |
| | Total of Binder | 9.633 | |

Pigment Component:

| Component | Component | Parts | Wt percent based on 100 pts binder |
|---|---|---|---|
| | Zinc Oxide | 3.224 | 3.224/9.633 = 33.5 wt % |
| | Calcium Magnesium Phosphate | 1.163 | 1.163/9.633 = 12.1 wt % |
| | Anionic surfactant | 0.096 | 0.096/9.633 = 1.0 wt % |
| | Total of Binder | 9.633 | |

Poly(Bisphenol A-Co-Epichlorohydrin) Glycidyl End-Capped type resin (MW range between 450 and 600) was used in comparative composition 2. It is a solid type standard Epoxy Resin derived from Bisphenol-A and Epichlorohydrin. Especially, it has excellent adhesion, chemical resistance, heat resistance, etc.

Anionic surfactant works following ionization. When added to water, the anionic surfactants ionize and have a negative charge. The negatively charged surfactants bind to positively charged particles. It is a blend of 35.5% anionic surfactant, 27.5% 1-Butanol, 1% Sodium bisulfite and 36% water. Anionic surfactant functions as an anti-settling agent for non-aqueous paints. As a modern anti-settling agent, it acts via adsorption phenomena on the pigment surface and effectively prevents pigments from settling and forming hard, difficult-to-stir sediments even in low-viscosity coatings such as, e.g., dipping paints and wash-primers. It is effective over a broad range of polarity. In addition, the uniform electrostatic charge imparted by the anionic surfactant prevents re-agglomeration thereby counteracting any premature settling of the pigments.

Inventive Composition 1:
Binder Component:

| Component | Component | Parts | Wt percent based on 100 pts binder |
|---|---|---|---|
| A1 | PVB | 6.516 | 6.516/10.250 = 63.6 wt % |
| A2 | Poly [(Phenyl Glycidyl Ether)-Co-Formaldehyde] | 1.534 | 1.534/10.250 = 15.0 wt % |
| A3 | Phosphoric Acid | 1.412 | 1.412/10.250 = 13.8 wt % |

-continued

| Component | Component | Parts | Wt percent based on 100 pts binder |
|---|---|---|---|
| A4 | Gamma-Glycidoxypropyltri methoxysilane | 0.548 | 0.548/10.250 = 5.4% |
| A5 | NONE | NONE | NONE |
| | Total of Binder | 10.250 | |

Pigment Component:

| Component | Component | Parts | Wt percent based on 100 pts binder |
|---|---|---|---|
| B2 | Ca Sr Zn Phosphosilicate | 4.766 | 4.766/10.250 = 46.5 wt % |
| B1 | Ca Ion-Exchanged Silica | 3.479 | 3.479/10.250 = 33.9 wt % |
| B3 | Polyethylene oxide terminated with a phosphate group | 0.240 | 0.240/10.250 = 2.3 wt % |
| | Total of Binder | 10.250 | |

PVB (polyvinyl alcohol content=12-16 wt %, polyvinyl acetate=1-4 wt %, average MW range from 50,000 to 60,000 g/mol) was used in inventive composition 1. The degree of acetalization in PVB determines its water resistance, solubility in organic solvents and its compatibility with other formulation components—for instance plasticizers and other resins. PVB can enter into crosslinking reactions with resins such as epoxides and phenolics. The crosslinking density depends chiefly on the degree of acetalization and on the number of OH groups available for the reaction. The water absorption of PVB declines with increasing degree of acetalization. Hydroxyl groups in the molecule are responsible for the excellent adhesion to polar surfaces and high toughness of the polymers.

Poly[(Phenyl Glycidyl Ether)-Co-Formaldehyde] resin (epoxy molar mass=169-175 g/equivalent) was used in inventive composition 1. This resin is a low viscosity multi-functional epoxy novolac resin for which the typical epoxy functionality is 2.5. It combines low viscosity and ease of processing with good thermal stability, mechanical strength and chemical resistance.

Polyethylene oxide terminated with a phosphate group had a molecular weight distribution of 440-800 and is terminated with a methoxy group at the other end.

Inventive Composition 2:
Binder Component:

| Component | Component | Parts | Wt percent based on 100 pts binder |
|---|---|---|---|
| A1 | PVB | 6.394 | 6.394/10.269 = 62.3 wt % |
| A2 | Poly(Bisphenol A-Co-Epichlorohydrin) Glycidyl End-Capped | 1.599 | 1.599/10.269 = 15.6 wt % |
| A3 | Phosphoric Acid | 1.412 | 1.412/10.269 = 13.8 wt % |
| A4 | Gamma-Glycidoxypropyltri methoxysilane | NONE | NONE |
| A5 | Polymeric Phosphate Ester | 0.629 | 0.629/10.269 = 6.1 wt % |
| | Total of Binder | 10.269 | |

PVB (polyvinyl alcohol content=12-16 wt %, polyvinyl acetate=1-4 wt %, average MW range from 50,000 to 60,000 g/mol) was used in inventive composition 2. The degree of acetalization in PVB determines its water resistance, solubility in organic solvents and its compatibility with other formulation components—for instance plasticisers and other resins. PVB can enter into crosslinking reactions with resins such as epoxides and phenolics. The crosslinking density depends chiefly on the degree of acetalization and on the number of OH groups available for the reaction. The water absorption of PVB declines with increasing degree of acetalization. Hydroxyl groups in the molecule are responsible for the excellent adhesion to polar surfaces and high toughness of the polymers.

Poly(Bisphenol A-Co-Epichlorohydrin) Glycidyl End-Capped type resin (MW range between 450 and 600) was used in inventive composition 2. It is a solid type standard Epoxy Resin derived from Bisphenol-A and Epichrolohydrin. Especially, it has excellent adhesion, chemical resistance, heat resistance, etc.

Polymeric Phosphate Ester used was the reaction product of a styrene/allyl alcohol 2.33/1 copolymer of approximately 1600 weight average molecular weight with orthophosphoric acid and p-tert-amyl phenol in a 1:3:3 mole ratio reacted to approximately 3500 weight average molecular weight.

Pigment Component:

| Component | Component | Parts | Wt percent based on 100 pts binder |
|---|---|---|---|
| B2 | Ca Sr Zn Phosphosilicate | 4.677 | 4.677/10.269 = 45.6 wt % |
| B1 | Ca Ion-Exchanged Silica | 3.414 | 3.414/10.269 = 33.3 wt % |
| B3 | Polyethylene oxide terminated with a phosphate group | 0.235 | 0.235/10.269 = 2.3 wt % |
| | Total of Binder | 10.269 | |

Inventive Composition 3:
Binder Component:

| Component | Component | Parts | Wt percent based on 100 pts binder |
|---|---|---|---|
| A1 | PVB | 6.443 | 6.443/10.244 = 62.9 wt % |
| A2 | Poly(Bisphenol A-Co-Epichlorohydrin) Glycidyl End-Capped | 1.611 | 1.611/10.244 = 15.7 wt % |
| A3 | Phosphoric Acid | 1.412 | 1.412/10.244 = 13.8 wt % |
| A4 | Gamma-Glycidoxypropyltri methoxysilane | 0.541 | 0.541/10.244 = 5.3 wt % |
| A5 | NONE | NONE | NONE |
| | Total of Binder | 10.244 | |

Pigment Component:

| Component | Component | Parts | Wt percent based on 100 pts binder |
|---|---|---|---|
| B2 | Ca Sr Zn Phosphosilicate | 4.713 | 4.713/10.244 = 46.0 wt % |
| B1 | Ca Ion-Exchanged Silica | 3.414 | 3.414/10.244 = 33.3 wt % |

| Component | Component | Parts | Wt percent based on 100 pts binder |
|---|---|---|---|
| B3 | Polyethylene oxide terminated with a phosphate group | 0.237 | 0.237/10.244 = 2.3 wt % |
| | Total of Binder | 10.244 | |

PVB (polyvinyl alcohol content=12-16 wt %, polyvinyl acetate=1-4 wt %, average MW range from 50,000 to 60,000 g/mol) was used in inventive composition 3. The degree of acetalization in PVB determines its water resistance, solubility in organic solvents and its compatibility with other formulation components—for instance plasticisers and other resins. PVB can enter into crosslinking reactions with resins such as epoxides and phenolics. The crosslinking density depends chiefly on the degree of acetalization and on the number of OH groups available for the reaction. The water absorption of PVB declines with increasing degree of acetalization. Hydroxyl groups in the molecule are responsible for the excellent adhesion to polar surfaces and high toughness of the polymers.

Poly(Bisphenol A-Co-Epichlorohydrin) Glycidyl End-Capped type resin (MW range between 450 and 600) was used in inventive composition 3. It is a solid type standard Epoxy Resin derived from Bisphenol-A and Epichlorohydrin. Especially, it has excellent adhesion, chemical resistance, heat resistance, etc.

Inventive Composition 4:
Binder Component:

| Component | Component | Parts | Wt percent based on 100 pts binder |
|---|---|---|---|
| A1 | PVB | 6.397 | 6.397/10.273 = 62.3 wt % |
| A2 | Poly(Bisphenol A-Co-Epichlorohydrin) Glycidyl End-Capped | 1.600 | 1.600/10.273 = 15.6 wt % |
| A3 | Phosphoric Acid | 1.412 | 1.412/10.273 = 13.8 wt % |
| A4 | Gamma-Glycidoxypropyltri methoxysilane | NONE | NONE |
| A5 | Polymeric Phosphate Ester | 0.629 | 0.629/10.273 = 6.1 wt % |
| | Total of Binder | 10.273 | |

Pigment Component:

| Component | Component | Parts | Wt percent based on 100 pts binder |
|---|---|---|---|
| B2 | Ca Sr Zn Phosphosilicate | 4.895 | 4.895/10.273 = 47.7 wt % |
| B1 | Ca Ion-Exchanged Silica | 4.895 | 4.895/10.273 = 47.7 wt % |
| B3 | Polyethylene oxide terminated with a phosphate group | 0.235 | 0.235/10.273 = 2.3 wt % |
| | Total of Binder | 10.273 | |

PVB (polyvinyl alcohol content=12-16 wt %, polyvinyl acetate=1-4 wt %, average MW range from 50,000 to 60,000 g/mol) was used in inventive composition 4. The degree of acetalization in PVB determines its water resistance, solubility in organic solvents and its compatibility with other formulation components—for instance plasticisers and other resins. PVB can enter into crosslinking reactions with resins such as epoxides and phenolics. The crosslinking density depends chiefly on the degree of acetalization and on the number of OH groups available for the reaction. The water absorption of PVB declines with increasing degree of acetalization. Hydroxyl groups in the molecule are responsible for the excellent adhesion to polar surfaces and high toughness of the polymers.

Poly(Bisphenol A-Co-Epichlorohydrin) Glycidyl End-Capped type resin (MW range between 450 and 600) was used in inventive composition 4. It is a solid type standard Epoxy Resin derived from Bisphenol-A and Epichlorohydrin. Especially, it has excellent adhesion, chemical resistance, heat resistance, etc.

Inventive Composition 5:
Binder Component:

| Component | Component | Parts | Wt percent based on 100 pts binder |
|---|---|---|---|
| A1 | PVB | 4.263 | 4.263/9.736 = 43.8 wt % |
| A2 | Poly(Bisphenol A-Co-Epichlorohydrin) Glycidyl End-Capped | 3.197 | 3.197/9.736 = 32.8 wt % |
| A3 | Phosphoric Acid | 1.412 | 1.405/9.736 = 14.5 wt % |
| A4 | Gamma-Glycidoxypropyltri methoxysilane | NONE | NONE |
| A5 | Polymeric Phosphate Ester | 0.629 | 0.629/9.736 = 6.5 wt % |
| | Total of Binder | 9.736 | |

Pigment Component:

| Component | Component | Parts | Wt percent based on 100 pts binder |
|---|---|---|---|
| B2 | Ca Sr Zn Phosphosilicate | 4.677 | 4.677/9.736 = 48.0 wt % |
| B1 | Ca Ion-Exchanged Silica | 3.414 | 3.414/9.736 = 35.1 wt % |
| B3 | Polyethylene oxide terminated with a phosphate group | 0.235 | 0.235/9.736 = 2.4 wt % |
| | Total of Binder | 9.736 | |

PVB (polyvinyl alcohol content=12-16 wt %, polyvinyl acetate=1-4 wt %, average MW range from 50,000 to 60,000 g/mol) was used in inventive composition 5. The degree of acetalization in PVB determines its water resistance, solubility in organic solvents and its compatibility with other formulation components—for instance plasticisers and other resins. PVB can enter into crosslinking reactions with resins such as epoxides and phenolics. The crosslinking density depends chiefly on the degree of acetalization and on the number of OH groups available for the reaction. The water absorption of PVB declines with increasing degree of acetalization. Hydroxyl groups in the molecule are responsible for the excellent adhesion to polar surfaces and high toughness of the polymers.

Poly(Bisphenol A-Co-Epichlorohydrin) Glycidyl End-Capped type resin (MW range between 450 and 600) was used in inventive composition 5. It is a solid type standard Epoxy Resin derived from Bisphenol-A and Epichlorohydrin. Especially, it has excellent adhesion, chemical resistance, heat resistance, etc.

Each of the Comparative Compositions 1 and 2 and the Inventive Compositions 1-5 are evaluated as described below.

Assessment of degree of blistering is performed according DIN EN ISO 4628-2 wherein 0=no blisters, 5=dense/large blisters, and wr=wrinkling.

Assessment of cross hatch is performed according to DIN EN ISO 2409 wherein a 2 mm (60-120 μm) or 3 mm (121-250 μm) grid is used in conjunction with 1× Tesa 4657 tape. Duplicate measurements are used along with a 2 cm distance to the edge of the panel.

Assessment of degree of delamination and corrosion around a scribe or other artificial defect is performed according to DIN EN ISO 4628-8 (applicable for VDA 233-102, neutral salt spray on CRS and galvanized steel, and acetic acid salt spray on Al 6014). The length of scrape is at least 12 cm and a mean value of six measurements is reported. Measurements start at least 1 cm from the edge of the scribe and are taken with similar distances along the scribe. Creep or delamination is reported as the mean of the distance of the fully removed paint to the scribe minus 0.2 mm (width of scribe) divided by 2. On steel, creep is a brownish dark iron oxide precipitation near the scribe, whereas delaminations are blank delaminated areas. The latter are caused by OH⁻ formation and pH increase. Direct evaluation is preferred because flash rust formation can hinder evaluation. Only primer delamination to the metal is documented. No topcoat delamination is documented.

Standard Test Method for Evaluating Degree of Blistering of Paints, ASTM D714-02, wherein a standard procedure of describing the size and density of blisters so that comparisons of severity is made. Two characteristics of blistering were evaluated using this standard test method: size and frequency:

Size: reference standards have been selected for four steps as to size on a numerical scale from 10 to 0, in which No. 10 represents no blistering. Blistering standard No. 8 represents the smallest size blister easily seen by the unaided eye. Blistering standards Nos. 6, 4, and 2 represent progressively larger sizes.

Frequency: reference standards have been selected for four steps in frequency at each step-in size, designated as follows: Dense, D; Medium dense, MD; Medium, M; and Few, F.

Assessment of degree of filiform corrosion is performed according to DIN EN ISO 4628-10. The procedure involves measuring the maximum distances Ll and Lr, in mm, from the scribed line to the point to which the filiform corrosion has developed on the left-hand side and on the right-hand side respectively. The length of the longest filament L is reported which is the mean value of Ll and Lr; In addition, the distances Ml and Mr, in mm, are measured from the scribed line to which the majority of filaments have developed from the left-hand side and on the right-hand side respectively. The most frequent filament length M is reported, which is the mean value of Ml and Mr. Finally, the numerical ratings of the length of the longest filament L and the most frequent filament length M are expressed as filiform corrosion, L5/M3, meaning a length of the longest filament is 5 mm and a most frequent filament length is 3 mm.

The results of these evaluations are set forth in the Tables below. In the Tables, the nomenclature (*) indicates that the Inventive Example performed better than both Comparative Examples 1 and 2, () indicates that the Inventive Example performed better than Comparative Example 2 but worse than the chromated Comparative Example 1, and (*) indicates that the Inventive Example performed worse than both Comparative Examples 1 and 2.

TABLE 1

DIN EN ISO 6270-2: Determination of resistance to humidity on Al 6014 alloy

| Material | Comparative Example 1 (Chromated) | | Comparative Example 2 (Non-Chromated) | | Inventive Example 1 | | Inventive Example 2 | | Inventive Example 3 | |
|---|---|---|---|---|---|---|---|---|---|---|
| Humidity Test Duration - 240 hrs | | | | | | | | | | |
| Substrate: | AA6014 | | AA6014 | | AA6014 | | AA6014 | | AA6014 | |
| cross hatch (initial) mm | 0.5 | | 0 | | 0 | | 0.5 | | 0 | |
| blisters after 1 h [quantity/size] | 0 | 0 | 5 | 1 | 0 | 0 | 0 | 0 | 0 | 0 |
| cross hatch after 1 h; | 4.5 | | 5 | | 1.5* | | 1.5* | | 0* | |
| cross hatch after 24; | 3 | | 3.5 | | 1* | | 1.5* | | 1* | |

TABLE 2

DIN EN ISO 6270-2 Determination of resistance to humidity on Al 5083 alloy

| Material | Comparative Example 1 (Chromated) | | Comparative Example 2 (Non-Chromated) | | Inventive Example 1 | | Inventive Example 2 | | Inventive Example 3 | |
|---|---|---|---|---|---|---|---|---|---|---|
| Humidity Test Duration - 240 hrs | | | | | | | | | | |
| Substrate: | AA5083 | | AA5083 | | AA5083 | | AA5083 | | AA5083 | |
| cross hatch (initial) mm | 1 | | 0 | | 0 | | 0 | | 0 | |
| blisters after 1 h [quantity/size] | 0 | 0 | 5 | 2 | 4** | 3*** | 3** | 2** | 4** | 2** |

TABLE 2-continued

DIN EN ISO 6270-2 Determination of resistance to humidity on Al 5083 alloy

| Material | Comparative Example 1 (Chromated) | Comparative Example 2 (Non-Chromated) | Inventive Example 1 | Inventive Example 2 | Inventive Example 3 |
|---|---|---|---|---|---|
| | Humidity Test Duration - 240 hrs | | | | |
| Substrate: | AA5083 | AA5083 | AA5083 | AA5083 | AA5083 |
| cross hatch after 1 h; | 2.5 | 5 | 5** | 5** | 5** |
| cross hatch after 24 h; | 3.5 | 4.5 | 4** | 4.5** | 5*** |

TABLE 3

DIN EN ISO 6270-2: Determination of resistance to humidity on cold rolled steel (CRS)

| Material | Comparative Example 1 (Chromated) | Comparative Example 2 (Non-Chromated) | Inventive Example 1 | Inventive Example 2 | Inventive Example 3 |
|---|---|---|---|---|---|
| | Humidity Test Duration - 240 hrs | | | | |
| Substrate: | CRS | CRS | CRS | CRS | CRS |
| cross hatch (initial) mm | 0.5 | 1 | 0 | 0 | 0 |
| blisters after 1 h [quantity/size] | 0  0 | 0  0 | 0  0 | 0  0 | 0  0 |
| cross hatch after 1 h; | 4.5 | 2.5 | 2* | 1.5* | 1.5* |
| cross hatch after 24 h; | 3.5 | 2 | 0* | 0* | 1* |

TABLE 4

DIN EN ISO 6270-2: Determination of resistance to humidity on cold galvanized steel

| Material | Comparative Example 1 (Chromated) | Comparative Example 2 (Non-Chromated) | Inventive Example 1 | Inventive Example 2 | Inventive Example 3 |
|---|---|---|---|---|---|
| | Humidity Test Duration - 240 hrs | | | | |
| Substrate: | Galvanized Steel | Galvanized Steel | Galvanized Steel | Galvanized Steel | Galvanized Steel |
| cross hatch (initial) mm | 0.5 | 0.5 | 0 | 0 | 0 |
| blisters after 1 h [quantity/size] | 0  0 | 4  3 | 0  0 | 0  0 | 0  0 |
| cross hatch after 1 h; | 4.5 | 5 | 1.5* | 0* | 0.5* |
| cross hatch after 24 h; | 4.5 | 3 | 0* | 0* | 0* |

TABLE 5

VDA 233-102: Cyclic corrosion testing on cold rolled steel (CRS)

| Material | Comparative Example 1 (Chromated) | Comparative Example 2 (Non-Chromated) | Inventive Example 1 | Inventive Example 2 | Inventive Example 3 |
|---|---|---|---|---|---|
| | VDA Cycle new (233-102)/cycles: 6 | | | | |
| Substrate: | CRS | CRS | CRS | CRS | CRS |
| blisters after 1 h [quantity/size] | 0  0 | 0  0 | 0  0 | 0  0 | 0  0 |
| creep without scratch [mm] | 4.5 | 4.8 | 3.2* | 3.4* | 4.5* |

TABLE 6

VDA 233-102: Cyclic corrosion testing on galvanized steel

| Material | Comparative Example 1 (Chromated) | Comparative Example 2 (Non-Chromated) | Inventive Example 1 | Inventive Example 2 | Inventive Example 3 |
|---|---|---|---|---|---|
| | VDA Cycle new (233-102)/cycles: 6 | | | | |
| | Substrate: | | | | |
| | Galvanized Steel | Galvanized Steel | Galvanized Steel | Galvanized Steel | Galvanized Steel |
| blisters after 1 h [quantity/size] | 0  0 | 0  0 | 0  0 | 0  0 | 0  0 |
| creep without scratch [mm] | 1.4 | 1.2 | 0* | 0* | 0* |

TABLE 7

DIN EN ISO 9227: Corrosion tests in artificial atmospheres-acetic acid salt spray resistance on Al 5083 alloy

| Material | Comparative Example 1 (Chromated) | Comparative Example 2 (Non-Chromated) | Inventive Example 1 | Inventive Example 2 | Inventive Example 3 |
|---|---|---|---|---|---|
| | Acetic Acid Salt Spray - 504 hours | | | | |
| Substrate: | AA5083 | AA5083 | AA5083 | AA5083 | AA5083 |
| blisters on surface 1 h [quantity/size] | 0  0 | 0  0 | 0  0 | 0  0 | 0  0 |
| | 0 | 9.5 | 6.5** | 7.5** | 3.5** |

TABLE 8

DIN EN ISO 4623-2: Determination of resistance to filiform corrosion on Al 6014 alloy

| Material | Comparative Example 1 (Chromated) | Comparative Example 2 (Non-Chromated) | Inventive Example 1 | Inventive Example 2 | Inventive Example 3 |
|---|---|---|---|---|---|
| | Filiform Test - 504 hours | | | | |
| Substrate: | AA6014 | AA6014 | AA6014 | AA6014 | AA6014 |
| longest filament L/ the most frequent filament length M (vertical) [mm] | L2M2 | L3M3 | L2M1.5* | L2M1.5* | L2M2* |
| longest filament L/ the most frequent filament length M (horizontal) [mm] | L2M2 | L3M3 | L2M1* | L2.5M1.5** | L2.5M2** |

In the Tables below, the nomenclature (#) indicates that the Inventive Example performed equal to or better than both Comparative Example 1.

TABLE 9

ASTM D714-02: Standard Test Method for Evaluating Degree of Blistering of Paints

| Material | Comparative Example 1 (Chromated) | Inventive Example 4 | Inventive Example 5 |
|---|---|---|---|
| | Humidity Test Duration - 240 hrs | | |
| Substrate: | AA6014 | AA6014 | AA6014 |
| cross hatch (initial) mm | 10 | 10 | 9 |
| blisters after 1 h [quantity/size] | 10 10 No Blistering | 10 0 No Blistering | 10 0 No Blistering |
| cross hatch after 1 h | 7 | 9# | 5 |
| cross hatch after 24 | 6 | 9# | 5 |

TABLE 10

ASTM D714-02: Standard Test Method for Evaluating Degree of Blistering of Paints

| Material | Comparative Example 1 (Chromated) | Inventive Example 4 | Inventive Example 5 |
|---|---|---|---|
| | Humidity Test Duration - 240 hrs | | |
| Substrate: | CRS | CRS | CRS |
| cross hatch (initial) mm | 9 | 6 | 8 |
| blisters after 1 h [quantity/size] | 10 0 No Blistering | 4 More Than Medium Blistering | 8 Medium Blistering |
| cross hatch after 1 h | 3 | 6# | 2 |
| cross hatch after 24 | 4 | 4# | 5# |

TABLE 11

VDA 233-102: Cyclic corrosion testing on cold rolled steel (CRS)

| Material | Comparative Example 1 (Chromated) | Inventive Example 4 | Inventive Example 5 |
|---|---|---|---|
| | VDA Cycle new (233-102)/cycles: 6 | | |
| Substrate: | CRS | CRS | CRS |
| blistus after 1 h [quantity/size] | 0 0 | 0 0 | 0 0 |
| creep without scraping [mm] | 3.2 | 1.0# | 1.2# |

TABLE 12

VDA 233-102: Cyclic corrosion testing on Al 6014 alloy

| Material | Comparative Example 1 (Chromated) | Inventive Example 4 | Inventive Example 5 |
|---|---|---|---|
| | VDA Cycle new (233-102)/cycles: 6 | | |
| Substrate: | Al6014 | Al6014 | Al6014 |
| blisters after 1 h [quantity/size] | 0 0 | 0 0 | 0 0 |
| creep without scraping [mm] | 0 | 0.2 | 0.1 |

TABLE 13

DIN EN ISO 9227: Corrosion tests in artificial atmospheres - acetic acid salt spray resistance on Al 6014 alloy

| Material | Comparative Example 1 (Chromated) | Inventive Example 4 | Inventive Example 5 |
|---|---|---|---|
| | AASS - 1008 hrs | | |
| Substrate: | AA6014 | AA6014 | AA6014 |
| blisters after 1 h [quantity/size] | 0 0 | 0 0 | 0 0 |
| Blister around scribe without scratch, 1 h [mm] | 0.2 | 0.4 | 0.2 |
| creep without scratch, 1 h [mm] | 0.2 | 0.2# | 0.2# |
| Delamination after scratch, 1 h mm | 0.2 | 0.2# | 0.2# |

TABLE 14

DIN EN ISO 4623-2: Determination of resistance to filiform corrosion on Al 6014 alloy

| Material | Comparative Example 1 (Chromated) | Inventive Example 4 | Inventive Example 5 |
|---|---|---|---|
| | Filiform Test - 1008 hours | | |
| Substrate: | Al 6014 | Al 6014 | Al 6014 |
| longest filament L/the most frequent filament length M (vertical) [mm] | L1M1 | L4M3 | Light Micro structure L4M3 |
| longest filament L/the most frequent filament length M (horizontal) [mm] | L1.5M1 | L2M1 | L4M2.5 |

TABLE 15

| | DIN EN ISO 4623-2: Determination of resistance to filiform corrosion on CRS | | |
|---|---|---|---|
| Material | Comparative Example 1 (Chromated) | Inventive Example 4 | Inventive Example 5 |
| | Filiform Test - 1008 hours | | |
| Substrate: | CRS | CRS | CRS |
| longest filament L/the most frequent filament length M (vertical) [mm] | L2.5M1 | L1M1# | L0M0# |
| longest filament L/the most frequent filament length M (horizontal) [mm] | L1.5M1 | L1M1# | L0M0# |

The data shows that comparative examples, both chromate-containing and chromate free, have weak humidity performance over all the substrates tested. The inventive examples all perform better than the comparative examples except over 5083 grade aluminum, over which the chromate-containing comparative example performs somewhat better than both the chromate-free comparative example and the inventive examples. The poor humidity performance of conventional wash primers, both chromated and chromate free, is well known to those skilled in the art.

The data also shows that, in VDA cyclic corrosion testing, the inventive examples are superior to both comparative examples over galvanized steel. Over CRS, all three inventive examples are better than the chromate-free comparative example, and inventive examples 1 and 2 are better than the chromate-containing comparative example.

The data further shows that, in filiform corrosion testing, all three inventive examples are superior to the chromate-free comparative example and comparable to the chromate-containing comparative example. Inventive example 1 was slightly better than the chromated comparison example.

The data also shows that, in acidified salt spray testing, all three inventive examples were superior to the chromate-free comparative example but were inferior to the chromate-containing comparative example.

The humidity resistance data shows that the inventive example 4 exhibits better performance than comparative example 1 (chromated) over both Al 6014 and CRS. Inventive example 5 is slightly weaker over Al 6014 but equivalent over CRS, compared to comparative example 1.

The data also shows that, in VDA cyclic corrosion testing, the inventive examples are superior to comparative example 1 over CRS. Over Al 6014, both the inventive examples are slightly weaker than the chromated comparative example.

The data also shows that, in acidified salt spray testing, both the inventive examples were equivalent to the comparative example 1.

The data further shows that, in filiform corrosion testing over CRS, both the inventive examples were better than the comparative example 1. Over Al 6014, chromated comparative example was better than both the inventive examples.

In various additional non-limiting embodiments, it is contemplated that any one or more components of any one or more examples may be replaced with any one or more corresponding components set forth in the detailed description. Similarly, in other additional non-limiting embodiments, the amounts of any one or more of the examples may be replaced with any one or more amounts of the corresponding components set forth in the detailed description. In other words, the Examples are not necessarily limited to precisely those components and amounts explicitly set forth above and may be modified by those of skill in the art.

It is herein expressly contemplated that all combination of the aforementioned mentioned components, amounts, ranges, values, method steps, etc. are used in various non-limiting embodiments. More specifically, all combinations are hereby expressly contemplated even if the various components, amounts, ranges, values, method steps, etc. are not described in the same or adjacent paragraphs above. Moreover, in various non-limiting embodiments, all values and ranges of values including and between those set forth above are expressly contemplated for use herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A coating composition comprising:
    A. a binder component comprising;
        (A1) polyvinyl butyral present in an amount of from about 30 to about 70 parts by weight based on 100 parts by weight of said binder component;
        (A2) a film forming resin that is Poly(Bisphenol A-Co-Epichlorohydrin) Glycidyl End-Capped and that is present in an amount of from about 10 to about 40 parts by weight based on 100 parts by weight of said binder component;
        (A3) an acid present in an amount of from about 13 to about 30 parts by weight based on 100 parts by weight of said binder component; and
        (A4) a functionalized tri-alkoxy silane present in an amount of from about 3 to about 10 parts by weight based on 100 parts by weight of said binder component;
    B. a pigment component comprising;
        (B1) a calcium ion-exchanged silica present in an amount of from about 30 to about 40 parts by weight based on 100 parts by weight of said binder component;
        (B2) a corrosion inhibiting pigment present in an amount of from about 40 to about 50 parts by weight based on 100 parts by weight of said binder component; and
        (B3) a polyalkylene oxide phosphate present in an amount of from about 1 to about 7 parts by weight based on 100 parts by weight of said binder component.

2. The coating composition of claim 1 wherein the polyvinyl butyral is present in an amount of from about 60 to about 65 parts by weight based on 100 parts by weight of said binder component.

3. The coating composition of claim 1 wherein the film forming resin is present in an amount of from about 13 to about 17 parts by weight based on 100 parts by weight of said binder component.

4. The coating composition of claim 1 wherein the acid is present in an amount of from about 13 to about 15 parts by weight based on 100 parts by weight of said binder component.

5. The coating composition of claim 4 wherein the acid is phosphoric acid.

6. The coating composition of claim 1 wherein the functionalized tri-alkoxy silane is present in an amount of from about 4 to about 6 parts by weight based on 100 parts by weight of said binder component.

7. The coating composition of claim 6 wherein the functionalized tri-alkoxy silane is gamma-glycidoxypropyltrimethoxysiliane.

8. The coating composition of claim 1 wherein the calcium ion-exchanged silica is present in an amount of from about 30 to about 35 parts by weight based on 100 parts by weight of said binder component.

9. The coating composition of claim 1 wherein the corrosion inhibiting pigment is present in an amount of from about 45 to about 50 parts by weight based on 100 parts by weight of said binder component.

10. The coating composition of claim 9 wherein the corrosion inhibiting pigment is Ca Sr Zn Phosphosilicate.

11. The coating composition of claim 1 wherein the polyalkylene oxide phosphate is present in an amount of from about 2 to about 5 parts by weight based on 100 parts by weight of said binder component.

12. The coating composition of claim 11 wherein the polyalkylene oxide phosphate is polyethylene oxide terminated with a phosphate group.

13. The coating composition of claim 1 consisting essentially of (A1)-(A4) and (B1)-(B3) wherein (A1) is present in an amount of about 60 to about 70 parts by weight based on 100 parts by weight of said binder component, (A2) is present in an amount of about 10 to about 20 parts by weight based on 100 parts by weight of said binder component, and/or (A3) is present in an amount of about 13 to about 20 parts by weight based on 100 parts by weight of said binder component.

14. The coating composition of claim 13 wherein:
the polyvinyl butyral is present in an amount of from about 60 to about 65 parts by weight based on 100 parts by weight of said binder component;
the film forming resin is present in an amount of from about 13 to about 17 parts by weight based on 100 parts by weight of said binder component;
the acid is phosphoric acid and is present in an amount of from about 13 to about 15 parts by weight based on 100 parts by weight of said binder component;
the functionalized tri-alkoxy silane is gamma-glycidoxypropyltrimethoxysiliane and is present in an amount of from about 3 to about 10 parts by weight based on 100 parts by weight of said binder component;
the calcium ion-exchanged silica is present in an amount of from about 30 to about 35 parts by weight based on 100 parts by weight of said binder component;
the corrosion inhibiting pigment is Ca Sr Zn Phosphosilicate and is present in an amount of from about 45 to about 50 parts by weight based on 100 parts by weight of said binder component; and
the polyalkylene oxide phosphate is polyethylene oxide terminated with a phosphate group and is present in an amount of from about 2 to about 5 parts by weight based on 100 parts by weight of said binder component.

15. The coating composition of claim 13 wherein:
the polyvinyl butyral is present in an amount of about 63 parts by weight based on 100 parts by weight of said binder component;
the film forming resin is present in an amount of about 16 parts by weight based on 100 parts by weight of said binder component;
the acid is phosphoric acid and is present in an amount of about 14 parts by weight based on 100 parts by weight of said binder component;
the functionalized tri-alkoxy silane is gamma-glycidoxypropyltrimethoxysiliane and is present in an amount of about 5 parts by weight based on 100 parts by weight of said binder component;
the calcium ion-exchanged silica is present in an amount of about 33 parts by weight based on 100 parts by weight of said binder component;
the corrosion inhibiting pigment is Ca Sr Zn Phosphosilicate and is present in an amount of about 46 parts by weight based on 100 parts by weight of said binder component; and
the polyalkylene oxide phosphate is polyethylene oxide terminated with a phosphate group and is present in an amount of about 2 parts by weight based on 100 parts by weight of said binder component.

16. The coating composition of claim 1 consisting of (A1)-(A4) and (B1)-(B3) wherein (A1) is present in an amount of about 60 to about 70 parts by weight based on 100 parts by weight of said binder component, (A2) is present in an amount of about 10 to about 20 parts by weight based on 100 parts by weight of said binder component, and/or (A3) is present in an amount of about 13 to about 20 parts by weight based on 100 parts by weight of said binder component.

17. The coating composition of claim 16 wherein:
the polyvinyl butyral is present in an amount of from about 60 to about 65 parts by weight based on 100 parts by weight of said binder component;
the film forming resin is present in an amount of from about 13 to about 17 parts by weight based on 100 parts by weight of said binder component;
the acid is phosphoric acid and is present in an amount of from about 12 to about 15 parts by weight based on 100 parts by weight of said binder component;
the functionalized tri-alkoxy silane is gamma-glycidoxypropyltrimethoxysiliane and is present in an amount of from about 3 to about 10 parts by weight based on 100 parts by weight of said binder component;
the calcium ion-exchanged silica is present in an amount of from about 30 to about 35 parts by weight based on 100 parts by weight of said binder component;
the corrosion inhibiting pigment is Ca Sr Zn Phosphosilicate and is present in an amount of from about 45 to about 50 parts by weight based on 100 parts by weight of said binder component; and
the polyalkylene oxide phosphate is polyethylene oxide terminated with a phosphate group and is present in an amount of from about 2 to about 5 parts by weight based on 100 parts by weight of said binder component.

18. The coating composition of claim 16 wherein:
the polyvinyl butyral is present in an amount of about 63 parts by weight based on 100 parts by weight of said binder component;

the film forming resin is present in an amount of about 16 parts by weight based on 100 parts by weight of said binder component;

the acid is phosphoric acid and is present in an amount of about 14 parts by weight based on 100 parts by weight of said binder component;

the functionalized tri-alkoxy silane is gamma-glycidoxypropyltrimethoxysiliane and is present in an amount of about 5 parts by weight based on 100 parts by weight of said binder component;

the calcium ion-exchanged silica is present in an amount of about 33 parts by weight based on 100 parts by weight of said binder component;

the corrosion inhibiting pigment is Ca Sr Zn Phosphosilicate and is present in an amount of about 46 parts by weight based on 100 parts by weight of said binder component; and the polyalkylene oxide phosphate is polyethylene oxide terminated with a phosphate group and is present in an amount of about 2 parts by weight based on 100 parts by weight of said binder component.

19. A method of forming the coating composition of claim 1 comprising the step of combining (A1), (A2), (A3), (A4), (B1), (B2), and (B3).

20. A method comprising the step of applying the coating composition of claim 1 to a metal substrate.

* * * * *